US012668691B2

(12) United States Patent
Lee et al.

(10) Patent No.: US 12,668,691 B2
(45) Date of Patent: *Jun. 30, 2026

(54) THERMOPLASTIC RESIN COMPOSITION

(71) Applicant: LG Chem, Ltd., Seoul (KR)

(72) Inventors: Hyun Mo Lee, Daejeon (KR); Seul Ki Im, Daejeon (KR); Ji Hyun Park, Daejeon (KR); Yun Kon Kim, Daejeon (KR); Seung Jung Yu, Daejeon (KR); Seok Pil Sa, Daejeon (KR); Ki Soo Lee, Daejeon (KR); Eun Ji Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 590 days.

This patent is subject to a terminal disclaimer.

(21) Appl. No.: 18/017,022

(22) PCT Filed: Jul. 30, 2021

(86) PCT No.: PCT/KR2021/009959

§ 371 (c)(1),
(2) Date: Jan. 19, 2023

(87) PCT Pub. No.: WO2022/025697

PCT Pub. Date: Feb. 3, 2022

(65) Prior Publication Data

US 2023/0340243 A1 Oct. 26, 2023

(30) Foreign Application Priority Data

Jul. 30, 2020 (KR) ........................ 10-2020-0095282
Jul. 31, 2020 (KR) ........................ 10-2020-0096157
Jul. 29, 2021 (KR) ........................ 10-2021-0100047

(51) Int. Cl.
*C08L 23/12* (2006.01)
*C08L 53/00* (2006.01)
*C08L 53/02* (2006.01)

(52) U.S. Cl.
CPC ............... *C08L 23/12* (2013.01); *C08L 53/00* (2013.01)

(58) Field of Classification Search
CPC .................. C08F 212/08; C08F 295/00; C08F 210/00–14; C08L 23/12; C08L 53/00
See application file for complete search history.

(56) References Cited

U.S. PATENT DOCUMENTS 12,122,905 B2 * 10/2024 Lee ........................ C08F 212/08
2005/0119380 A1 * 6/2005 Iwashita ................. C08L 23/16 524/543

(Continued)

FOREIGN PATENT DOCUMENTS

CN 102341453 A 2/2012
CN 108250653 A 7/2018

(Continued)

OTHER PUBLICATIONS

Durmus, Ali, et al., "Investigation of rheological behaviors of polyolefin blend type thermoplastic elastomers for quantifying microstructure-property relationships", Korea-Australia Rheology Journal, May 2019, 31(2), pp. 97-110.

(Continued)

*Primary Examiner* — Justin R Fischer
(74) *Attorney, Agent, or Firm* — Lerner David LLP

(57) ABSTRACT

The present invention relates to a thermoplastic resin composition including a polyolefin-polystyrene-based multi-block copolymer having a structure in which a polystyrene chain is attached to both ends of a polypropylene and polyolefin chain, and the thermoplastic resin composition according to the present invention has excellent elongation and tensile strength as well as high fluidity properties, and thus, may exhibit excellent molding processability.

17 Claims, 2 Drawing Sheets

(56) References Cited

U.S. PATENT DOCUMENTS

| | | | |
|---|---|---|---|
| 2005/0119392 A1 | 6/2005 | Makagawa et al. | |
| 2006/0246804 A1 | 11/2006 | Thomas et al. | |
| 2008/0249219 A1 | 10/2008 | Uehara et al. | |
| 2009/0137708 A1* | 5/2009 | Kim .................... | C08L 23/0815 524/400 |
| 2009/0258973 A1 | 10/2009 | Mizukami et al. | |
| 2009/0324863 A1 | 12/2009 | Mizukami et al. | |
| 2010/0003882 A1 | 1/2010 | Sumi et al. | |
| 2011/0319548 A1 | 12/2011 | Hoya et al. | |
| 2013/0225020 A1 | 8/2013 | Flood et al. | |
| 2013/0299731 A1 | 11/2013 | Wright et al. | |
| 2014/0364532 A1 | 12/2014 | Dubois et al. | |
| 2014/0364555 A1 | 12/2014 | Wiegand et al. | |
| 2014/0371377 A1 | 12/2014 | Salazar | |
| 2016/0102164 A1 | 4/2016 | Wiegand et al. | |
| 2017/0292015 A1 | 10/2017 | Lim et al. | |
| 2018/0002474 A1 | 1/2018 | Zhou et al. | |
| 2018/0022852 A1 | 1/2018 | Lee et al. | |
| 2018/0186997 A1 | 7/2018 | Youm et al. | |
| 2019/0292361 A1 | 9/2019 | Flood et al. | |
| 2020/0031978 A1 | 1/2020 | Lee et al. | |
| 2020/0325324 A1 | 10/2020 | Flood et al. | |
| 2021/0002303 A1 | 1/2021 | Sa et al. | |
| 2021/0002473 A1 | 1/2021 | Lee et al. | |
| 2021/0017377 A1 | 1/2021 | Shin et al. | |
| 2021/0108066 A1 | 4/2021 | Hong et al. | |
| 2022/0177634 A1 | 6/2022 | Im et al. | |
| 2023/0116142 A1 | 4/2023 | Im et al. | |

FOREIGN PATENT DOCUMENTS

| | | | |
|---|---|---|---|
| CN | 110475795 | A | 11/2019 |
| JP | 2000143887 | A | 5/2000 |
| JP | 2000344840 | A | 12/2000 |
| JP | 2003226791 | A | 8/2003 |
| JP | 2019521224 | A | 7/2019 |
| KR | 20060133579 | A | 12/2006 |
| KR | 20060135846 | A | 12/2006 |
| KR | 20070097130 | A | 10/2007 |
| KR | 20080004517 | A | 1/2008 |
| KR | 20090098994 | A | 9/2009 |
| KR | 20150012237 | A | 2/2015 |
| KR | 101657925 | B1 | 9/2016 |
| KR | 20160139567 | A | 12/2016 |
| KR | 20160149146 | A | 12/2016 |
| KR | 20170076278 | A | 7/2017 |
| KR | 20170120885 | A | 11/2017 |
| KR | 101829382 | B1 | 2/2018 |
| KR | 101848781 | B1 | 4/2018 |
| KR | 20190063818 | A | 6/2019 |
| KR | 20190064279 | A | 6/2019 |
| KR | 101997324 | B1 | 7/2019 |
| KR | 20190114716 | A | 10/2019 |
| KR | 102071588 | B1 | 1/2020 |
| KR | 20200035667 | A | 4/2020 |
| TW | 201811911 | A | 4/2018 |
| WO | 2019190288 | A1 | 10/2019 |

OTHER PUBLICATIONS

International Search Report for PCT/KR2021/009959 mailed Nov. 23, 2021. 5 pgs.

Jong. Y. et al., “Synthesis of Polyolefin-block-polystyrene Through Sequential Coordination and Anionic Polymerizations” Journal of Polymer Science, Polymer Chemistry, Jun. 2016, pp. 3110-3118, vol. 54, Issue 19.

International Search Report for PCT/KR2021/009957 mailed Nov. 22, 2021. 4 pgs.

Kim, et al., “Polystyrene Chain Growth from Di-End-Functional Polyolefins for Polystyrene-Polyolefin-Polystyrene Block Copolymers”, Polymers Oct. 2017, 9(10), pp. 481. 14 pgs.

* cited by examiner

THERMOPLASTIC RESIN COMPOSITION

The present application is a national stage entry under 35 U.S.C. § 371 International Application No. of PCT/KR2021/009959 filed on Jul. 30, 2021, which claims priority from Korean Patent Application Nos. 10-2020-0095282 filed on Jul. 30, 2020, 10-2020-0096157 filed on Jul. 31, 2020, and 10-2021-0100047 filed on Jul. 29, 2021, all the disclosures of which are incorporated herein by reference.

TECHNICAL FIELD

The present invention relates to a thermoplastic resin composition including a polyolefin-polystyrene-based multi-block copolymer having a structure in which a polystyrene chain is attached to both ends of polypropylene and polyolefin chains.

BACKGROUND ART

In order to impart luxurious feel to automotive interior materials, a method for injecting a resin composition composed of polycarbonate and acrylonitrile-butadiene-styrene (ABS) and then bonding a skin material thereto has been used. However, there has been a problem in that the process is complicated and the unit price of a product is increased.

Accordingly, a polypropylene-based resin composition including polypropylene (PP) as a main component and an impact resistant reinforcing material and an inorganic filler has been utilized. Polypropylene has excellent rigidity and molding processability, and thus, is widely used as a material for automotive interior and exterior parts, but has weak impact strength, which is disadvantageous.

A polypropylene-based resin composition using an ethylene-α-olefin copolymer has balanced physical properties of impact strength, modulus of elasticity, flexural rigidity, etc., has good moldability, and is also cheap, which are advantageous. However, the polypropylene-based resin composition using an ethylene-α-olefin copolymer has limitations in securing impact resistance depending on various use environments.

In addition, styrene-ethylene-butylene-styrene (SEBS), which is a styrene-based thermoplastic elastic body, has also been used in a polypropylene-based resin composition, but SEBS is expensive, and has a problem of significantly degrading the fluidity of polypropylene, thereby causing flow marks or short shots.

Therefore, there is still a demand for the development of a thermoplastic resin composition which maintains high fluidity properties of polypropylene and the mechanical physical properties of which are not degraded.

PRIOR ART DOCUMENT

Patent Document (Patent Document 1) Korean Patent Laid-Open Publication No. 10-1657925.

DISCLOSURE OF THE INVENTION

Technical Problem

An aspect of the present invention provides a thermoplastic resin composition having excellent elongation and tensile strength while having high fluidity properties.

Technical Solution

According to an aspect of the present invention, there is provided a thermoplastic resin composition including (1) polypropylene, and (2) a polyolefin-polystyrene-based multi-block copolymer satisfying the following conditions (a) and (b).

(a) Complex viscosity (η*) at a temperature of 160° C. and a frequency (ω) of 0.5 rad/s: 40,000 to 350,000 Pa·s (b) Complex viscosity at a temperature of 160° C. and a frequency of 125 rad/s: 900 to 3, 500 Pa·s.

Advantageous Effects

A thermoplastic resin composition according to the present invention has excellent elongation and tensile strength as well as high fluidity properties, and thus, may exhibit excellent molding processability.

MODE FOR CARRYING OUT THE INVENTION

Figure 1:
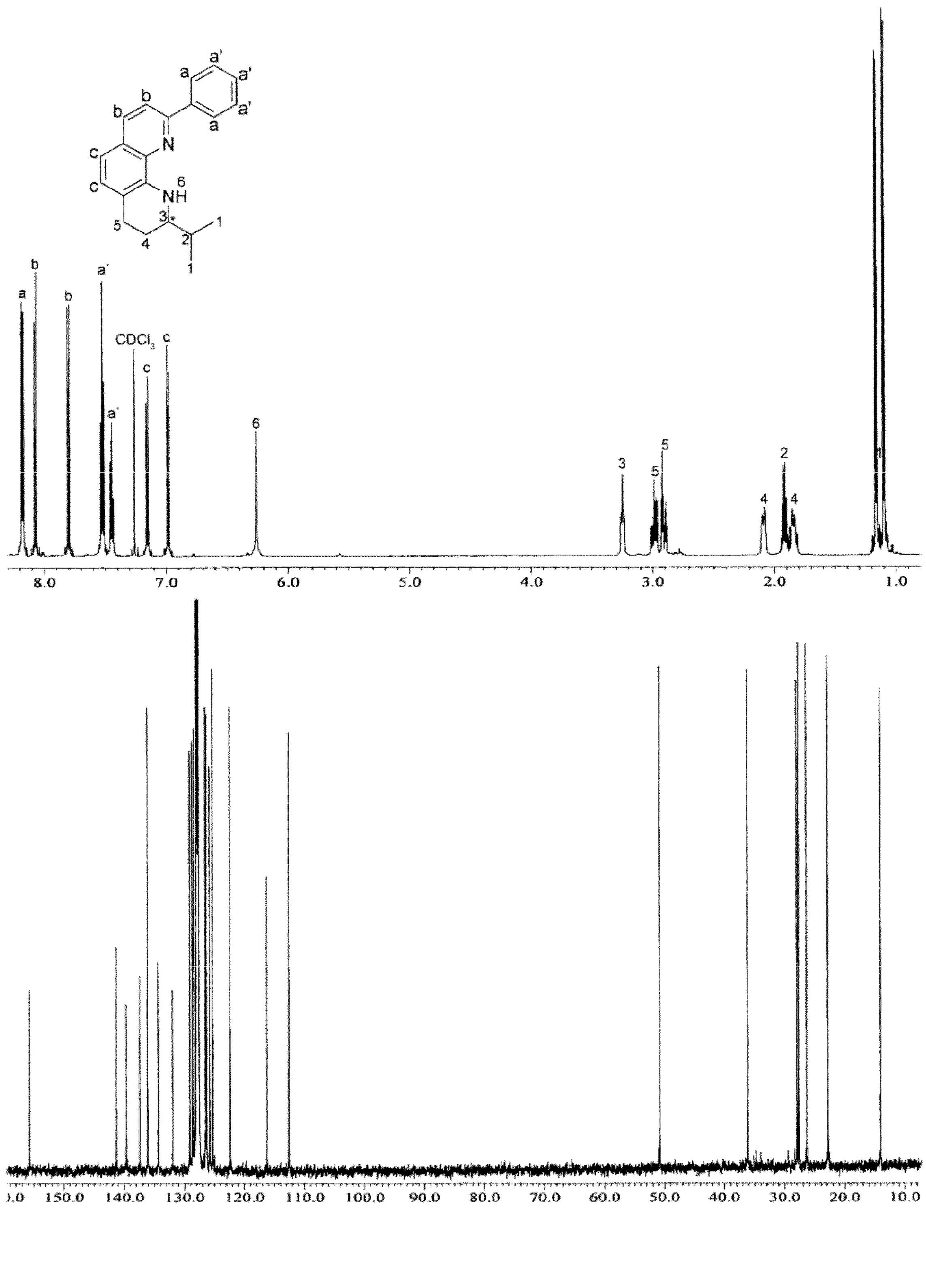
FIG. 1 shows $^{1}H$ NMR and $^{13}C$ NMR spectra of a ligand compound used in the preparation of a polyolefin-polystyrene-based multi-block copolymer included in a thermoplastic resin composition according to an embodiment of the present invention.

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The term "composition" as used herein includes not only a reaction product and a decomposition product formed from materials of a corresponding composition, but also a mixture of materials including the corresponding composition.

The term "polymer" as used herein refers to a polymer compound prepared by polymerizing monomers, whether of the same or different kinds. Thus, the generic term "polymer" covers the term "homopolymer" which is commonly used to refer to a polymer prepared from only one kind of monomer and the term "interpolymer" as defined below.

The term "interpolymer" as used herein refers to a polymer prepared by polymerizing at least two different kinds of monomers. Thus, the generic term "interpolymer" covers the term "copolymer" which is commonly used to refer to a polymer prepared from two different kinds of monomers and the term "polymer" prepared from two or more kinds of different monomers.

Hereinafter, the present invention will be described in detail.

A thermoplastic resin composition according to the present invention includes (1) polypropylene, and (2) a polyolefin-polystyrene-based multi-block copolymer satisfying the following conditions (a) and (b).

(a) Complex viscosity (η*) at a temperature of 160° C. and a frequency (ω) of 0.5 rad/s: 40,000 to 350,000 Pa·s (b) Complex viscosity at a temperature of 160° C. and a frequency of 125 rad/s: 900 to 3,500 Pa·s.

Hereinafter, each constituent component will be described in detail.

(1) Polypropylene

In the thermoplastic resin composition according to an embodiment of the present invention, the polypropylene may specifically be a polypropylene homopolymer, or a copolymer of propylene and an alpha-olefin monomer, wherein the copolymer may be an alternating or random, or block copolymer.

The alpha-olefin-based monomer may specifically be an aliphatic olefin having 2 to 12 carbon atoms, or 2 to 8 carbon atoms. More specifically, examples thereof may be ethylene, propylene, 1-butene, 1-pentene, 3-methyl-1-butene, 1-hexene, 4-methyl-1-pentene, 3-methyl-1-pentene, 1-heptene, 1-octene, 1-decene, 1-undecene, 1-dodecene, 1-tetradecene, 1-hexadecene, 1-eicosene, 4,4-dimethyl-1-pentene, 4,4-diethyl-1-hexene, 3,4-dimethyl-1-hexene, or the like, and any one thereof or a mixture of two or more thereof may be used.

More specifically, the polypropylene may be any one or a mixture of two or more selected from the group consisting of a polypropylene copolymer, a propylene-alpha-olefin copolymer, and a propylene-ethylene-alpha-olefin copolymer, wherein the copolymer may be a random or block copolymer.

In addition, the polypropylene may have a melt index (MI) of 0.5 g/10 min to 100 g/10 min measured at 230° C. and a 2.16 kg load. Specifically, the melt index (MI) may be 1 g/10 min to 90 g/10 min. When the melt index of polypropylene is out of the above range, there is a possibility that a problem may occur during injection molding of the thermoplastic resin composition.

Specifically, in the thermoplastic resin composition according to an embodiment of the present invention, the polypropylene may be an impact copolymer having a melt index (MI) of 0.5 g/10 min to 100 g/10 min, specifically 1 g/10 min to 90 g/10 min, measured at 230° C. and a 2.16 kg load, or more specifically, may be a polypropylene-ethylene impact copolymer. The impact copolymer may be included in an amount of 10 wt % to 90 wt %, specifically 20 wt % to 80 wt %, more specifically 40 wt % to 60 wt % based on the total weight of a polypropylene-based composite material. When an impact copolymer having the above physical properties is included as polypropylene in the above content range, strength properties, room temperature strength properties in particular, may be improved.

The impact copolymer may be prepared to satisfy the above physical property requirements using a typical polymer preparation reaction, or may be commercially obtained and used. A specific example thereof may include SEETEC™ M1600, a product of LG Chem, and the like.

In addition, in the thermoplastic resin composition according to an embodiment of the present invention, the polypropylene may specifically be one or more random propylene copolymers having a DSC melting point in the range of 120 to 160° C., and a melt flow rate (MFR) in the range of 5 g/10 min to 120 g/10 min measured under the condition of 230° C. and a 2.16 kg load according to ASTM-D 1238. The random propylene copolymer may be included in an amount of 10 wt % to 90 wt %, specifically 20 wt % to 80 wt %, more specifically 40 wt % to 60 wt % based on the total weight of a polypropylene-based composite material. When polypropylene having the above physical properties is included in the above-described content range, the mechanical strength of the thermoplastic resin composition such as hardness may be improved. The random propylene copolymer may be prepared to satisfy the above physical property requirements using a typical polymer preparation reaction, or may be commercially obtained and used. A specific example thereof may include Braskem™ PP R7021-50RNA of Braskem America Inc., Formolene™ 7320A of Formosa Plastics Corporation of USA, and the like.

(2) Polyolefin-Polystyrene-Based Multi-Block Copolymer

In the thermoplastic resin composition according to an embodiment of the present invention, the polyolefin-polystyrene-based multi-block copolymer is characterized by satisfying the following conditions (a) and (b).

(a) Complex viscosity (η*) at a temperature of 160° C. and a frequency (ω) of 0.5 rad/s: 40,000 to 350,000 Pa·s (b) Complex viscosity at a temperature of 160° C. and a frequency of 125 rad/s: 900 to 3,500 Pa·s.

The present inventors have studied to prepare a polyolefin-polystyrene-based multi-block copolymer having excellent processability, and have confirmed that a polyolefin-polystyrene-based multi-block copolymer having a specific range of complex viscosity, thereby implementing desired processability may be prepared by using a novel transition metal compound as a catalyst.

That is, the polyolefin-polystyrene-based multi-block copolymer included in the thermoplastic resin composition of the present invention is prepared by using a specific transition metal compound having a novel structure as a catalyst as to be described below, and has a low complex viscosity in a processing region, e.g., a high frequency region, and thus, exhibits excellent processability.

A complex viscosity graph according to a frequency may be measured using, for example, an advanced rheometric expansion system (ARES). The frequency means an angular velocity applied to a composite solution, and the unit thereof is rad/s. As the frequency increases, the viscosity of the composite solution decreases, which is referred to as shear thinning. That is, a graph showing complex viscosity (poise) of the y-axis according to frequency (rad/s) of the x-axis is associated with fluidity, and it is expressed that the lower the slope of the complex viscosity with respect to the frequency, the lower the fluidity, and the higher the slope, the higher the fluidity.

Compared to a typical polyolefin-polystyrene-based multi-block copolymer, the polyolefin-polystyrene-based multi-block copolymer included in the thermoplastic resin composition of the present invention has a low complex viscosity in a high frequency region, particularly at 120 to 500 rad/s, and thus, is greatly subjected to shear thinning, thereby exhibiting excellent fluidity processability.

Specifically, the polyolefin-polystyrene-based multi-block copolymer included in the thermoplastic resin composition of the present invention has a complex viscosity measured at a temperature of 160° C., specifically a complex viscosity at a frequency of 0.5 rad/s of 40,000 to 350,000 Pas, and a complex viscosity at a frequency of 125 rad/s of 900 to 3,500 Pa·s. Specifically, the complex viscosity at a frequency of 0.5 rad/s may be 45,000 to 300,000 Pa·s, and the complex viscosity at a frequency of 125 rad/s may be 1,000 to 3, 300 Pa·s, and more specifically, the complex viscosity at a frequency of 0.5 rad/s may be 46,000 to 290,000 Pa·s, and the complex viscosity at a frequency of 125 rad/s may be 1,000 to 3,200 Pa·s.

A complex viscosity (poise) with respect to a frequency (frequency, rad/s) is greatly associated with the fluidity of a copolymer. The higher the slope of the complex viscosity with respect to each frequency, the higher the fluidity, which means that the processability of a copolymer is good. The association between a complex viscosity with respect to a frequency and the fluidity of a copolymer may be described through a parameter such as MI 5 (@230° C.), and the like.

The weight average molecular weight of the polyolefin-polystyrene-based multi-block copolymer may be 50,000 to 400,000 g/mol, specifically 60,000 to 350,000 g/mol, or 70,000 to 300,000 g/mol, or 70,000 to 280,000 g/mol.

In addition, the molecular weight distribution of the polyolefin-polystyrene-based multi-block copolymer may be 1.5 to 3.0, specifically 1.6 to 2.5, 1.6 to 2.0, 1.5 to 2.5, 1.5 to 2.0, or 1.6 to 1.9.

The weight average molecular weight and a number average molecular weight are polystyrene conversion molecular weights analyzed by gel permeation chromatography (GPC), and the molecular weight distribution is calculated from the ratio of (weight average molecular weight)/(number average molecular weight).

The polyolefin-polystyrene-based multi-block copolymer may be one or more selected from the group consisting of a polystyrene-poly(ethylene-co-propylene)-polystyrene block copolymer, a polystyrene-poly(ethylene-co-1-butene)-polystyrene block copolymer, a polystyrene-poly(ethylene-co-1-pentene)-polystyrene block copolymer, a polystyrene-poly(ethylene-co-1-hexene)-polystyrene block copolymer, a polystyrene-poly(ethylene-co-1-heptene)-polystyrene block copolymer, and a polystyrene-poly(ethylene-co-1-octene)-polystyrene block copolymer.

In addition, a polyolefin block of the polyolefin-polystyrene-based multi-block copolymer included in the thermoplastic resin composition of the present invention may include one or more kinds of repeating units represented by Formula a below.

[Formula a]

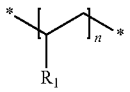

In Formula a above, $R_1$ may be hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, and n may be an integer of 1 to 10,000.

Alternatively, according to an embodiment of the present invention, $R_1$ may be hydrogen, or alkyl having 3 to 20 carbon atoms.

Alternatively, according to an embodiment of the present invention, $R_1$ may be hydrogen, or alkyl having 3 to 12 carbon atoms. Specifically, $R_1$ may be hydrogen, or alkyl having 4 to 12 carbon atoms.

Alternatively, n may be an integer of 10 to 10,000. Specifically, n may be an integer of 500 to 7,000.

Meanwhile, in the formulas shown in the specification of the present invention, "*" is a terminal site of a repeating unit and represents a connection site.

When the polyolefin block includes two or more kinds of repeating units represented by Formula a above, the polyolefin block may include a repeating unit represented by Formula b below.

[Formula b]

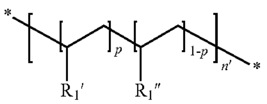

In Formula b above, $R_1'$ and $R_1''$ are each independently hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, wherein R1' and $R_1''$ are different from each other, $0<p<1$, and n' may be an integer of 1 to 10,000.

Alternatively, according to an embodiment of the present invention, R1' and $R_1''$ may each independently be hydrogen, or alkyl having 3 to 20 carbon atoms, and specifically, may each independently be hydrogen, or alkyl having 3 to 12 carbon atoms, and more specifically, may each independently be hydrogen, or alkyl having 4 to 12 carbon atoms.

Alternatively, n' may specifically be an integer of 10 to 10,000, and more specifically, may be an integer of 500 to 7,000.

According to an embodiment of the present invention, in Formula b above, any one of $R_1'$ or $R_1''$ may be hydrogen, and the other thereof may be a substituent other than hydrogen among the substituents described above.

That is, when the polyolefin block includes two or more kinds of repeating units represented by Formula a above, a structure in which $R_1$ is hydrogen and a structure in which $R_1$ is alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl other than hydrogen may be randomly connected. Specifically, a structure in which $R_1$ is hydrogen and a structure in which $R_1$ is alkyl having 3 to 20 carbon atoms other than hydrogen may be randomly connected.

Alternatively, more specifically, the polyolefin block may have a structure in which $R_1$ is hydrogen and a structure in which $R_1$ is alkyl having 3 to 12 carbon atoms randomly connected to each other. Even more specifically, the polyolefin block may have a structure in which $R_1$ is hydrogen and a structure in which $R_1$ is alkyl having 4 to 12 carbon atoms randomly connected to each other.

When the polyolefin block includes two or more kinds of repeating units represented by Formula a above, the polyolefin block may include a structure in which $R_1$ is hydrogen in Formula a above and a structure in which $R_1$ has a substituent other than hydrogen in a weight ratio of 30:90 to 70:10, specifically in a weight ratio of 40:60 to 60:40, and more specifically, in a weight ratio of 45:75 to 55:25.

When the polyolefin block includes a structure in which $R_1$ is hydrogen in Formula a above and a structure in which $R_1$ has a substituent other than hydrogen in the above range, a block copolymer prepared includes branches to an appropriate degree within a structure, and thus, has a high 300% modulus value and a high elongation at break value, thereby exhibiting excellent elasticity properties, and also exhibits a high molecular weight along with a wide molecular weight distribution, and thus, may have excellent processability.

In addition, a first polystyrene block of the polyolefin-polystyrene-based multi-block copolymer included in the thermoplastic resin composition of the present invention may include one or more kinds of repeating units represented by Formula c below.

[Formula c]

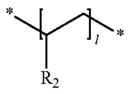

In Formula c above, $R_2$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and l is an integer of 10 to 1,000.

$R_2$ may be phenyl, or phenyl substituted or unsubstituted with halogen, alkyl having 1 to 8 carbon atoms, cycloalkyl having 3 to 12 carbon atoms, alkoxy having 1 to 8 carbon atoms, or aryl having 6 to 12 carbon atoms. Alternatively, $R_2$ may be phenyl.

l is an integer of 10 to 1,000, and may specifically be an integer of 50 to 700. When 1 is in the above range, the viscosity of a polyolefin-polystyrene block copolymer produced by the production method of the present invention may be at an appropriate level.

Particularly, in the polyolefin-polystyrene-based multi-block copolymer included in the thermoplastic resin composition of the present invention, the polyolefin block including a repeating unit represented by Formula a above and the first polystyrene block including a repeating unit represented by Formula c above may be bonded to each other to form a composite block represented by Formula d below.

[Formula d]

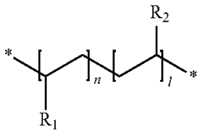

In Formula d above, $R_1$ may be hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, and $R_2$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, l is an integer of 10 to 1,000, and n is an integer of 1 to 10,000.

Alternatively, in Formula d above, $R_1$, $R_2$, l and n are the same as defined in Formula a and Formula c, respectively.

Alternatively, when the polyolefin block includes a repeating unit represented by Formula a above, a composite block formed by coupling a first polystyrene block including a repeating unit represented by Formula c above may be represented by Formula e below.

[Formula e]

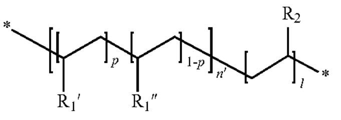

In Formula e above, $R_1'$, $R_1''$, $R_2$, p, l and n' are the same as defined in Formula a or c, respectively.

In addition, in one example of the present invention, when preparing a polyolefin-polystyrene-based multi-block copolymer, a styrene-based monomer may form a polyolefin block, and the styrene-based monomer may be simultaneously coupled to an organozinc compound and polymerized to form a separate styrene-based polymer block. In the present disclosure, the separate styrene-based polymer block is represented as a second polystyrene block. The second polystyrene block may include a repeating unit represented by Formula f below.

[Formula f]

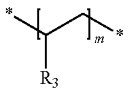

In Formula f above, $R_3$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and m is an integer of 10 to 1,000.

Alternatively, according to an embodiment of the present invention, $R_3$ may be phenyl, or phenyl substituted or unsubstituted with halogen, alkyl having 1 to 8 carbon atoms, cycloalkyl having 3 to 12 carbon atoms, alkoxy having 1 to 8 carbon atoms or aryl having 6 to 12 carbon atoms. Alternatively, $R_3$ may be phenyl.

m is an integer of 10 to 1,000, and may specifically be an integer of 50 to 700.

That is, the polyolefin-polystyrene-based multi-block copolymer included in the thermoplastic resin composition of the present invention may include a first polystyrene block including a repeating unit represented by Formula c above, and a second polystyrene block represented by Formula f above.

Accordingly, the block copolymer composition may include a triblock copolymer including a polyolefin block including one or more kinds of repeating units represented by Formula a below, a first polystyrene block including a repeating unit represented by Formula c below, and a second polystyrene block including a repeating unit represented by Formula f below.

[Formula a]

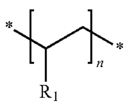

[Formula c]

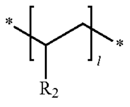

-continued

[Formula f]

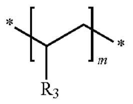

In the above formulas, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, $R_2$ and $R_3$ are aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, n is an integer of 10 to 10,000, and l and m are each independently an integer of 10 to 1,000.

Alternatively, in the above formulas, $R_1$, $R_2$, $R_3$, n, l and m are the same as defined in Formulas a, c, and f, respectively.

Preparation Method of Polyolefin-Polystyrene-Based Multi-Block Copolymer

A method for preparing the polyolefin-polystyrene-based multi-block copolymer is characterized by including (S1) forming a polyolefin block by polymerizing an olefin-based monomer using an organozinc compound as a chain transfer agent in the presence of a catalyst composition including a transition metal compound represented by Formula 1 below, and (S2) forming a polystyrene block by anionic polymerization of the polyolefin block and a styrene-based monomer in the presence of an alkyl lithium compound including silicon atom and a triamine compound.

The method for preparing the polyolefin-polystyrene-based multi-block copolymer may form a polyolefin-polystyrene-based multi-block copolymer exhibiting a specific height of a tan δ peak and a half-width of the tan δ peak by forming a polyolefin chain using a transition metal compound represented by Formula 1, which is efficiently utilized in the polymerization of an olefin-based monomer, as a catalyst, and then continuously performing styrene anion polymerization, thereby forming a polyolefin-polystyrene block as to be described later.

Step (S1)

Step (S1) is a step of forming a polyolefin block by polymerizing an olefin-based monomer using an organozinc compound as a chain transfer agent in the presence of a catalyst composition including a transition metal compound represented by Formula 1 below.

[Formula 1]

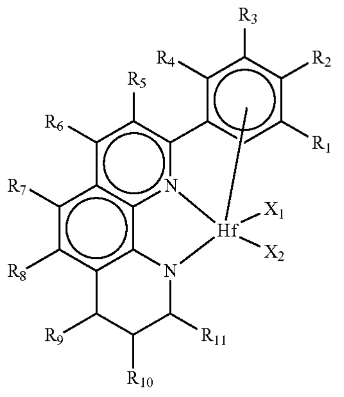

In Formula 1 above, $R_1$ to $R_{11}$ are each independently hydrogen, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkoxy group having 7 to 20 carbon atoms, an alkoxy group having 1 to 20 carbon atoms, an alkylaryl group having 7 to 20 carbon atoms, an alkylsilyl group having 1 to 20 carbon atoms, or an arylalkyl group having 7 to 20 carbon atoms, two or more of $R_1$ to $R_{11}$ which are adjacent to each other may be connected to each other to form an aliphatic ring having 3 to 20 carbon atoms or an aromatic ring having 6 to 20 carbon atoms, and $X_1$ and $X_2$ are each independently hydrogen, halogen, a hydroxyl group, an amino group, a thio group, a silyl group, a cyano group, a nitro group, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms, a heteroaryl group having 5 to 20 carbon atoms, an alkoxy group having 1 to 20 carbon atoms, an aryloxy group having 6 to 20 carbon atoms, an alkylamino group having 1 to 20 carbon atoms, an arylamino group having 6 to 20 carbon atoms, an alkylthio group having 1 to 20 carbon atoms, an arylthio group having 6 to 20 carbon atoms, an alkylsilyl group having 1 to 20 carbon atoms, or an arylsilyl group having 6 to 20 carbon atoms.

When a polymerization reaction is performed in the presence of an excess of a chain transfer agent (e.g., $(Et)_2Zn$) with respect to a catalyst, an olefin polymer chain causes rapid transalkylation between zinc (Zn) and hafnium (Hf) to uniformly grow from dialkylzinc, thereby implementing living polymerization, which is referred to as coordinated chain transfer polymerization (CCTP). Metallocene catalysts typically used cannot be subjected to living polymerization through a β-elimination (β-elimination) process, and a small number of catalysts known to be applicable to CCTP only allow single polymerization of ethylene and an alpha-olefin, so that it is very difficult to perform the polymerization of ethylene and an alpha-olefin through CCTP. Therefore, it has been very difficult to perform living polymerization through CCTP using a common transition metal compound as a catalyst and to prepare a block copolymer.

On the other hand, a hafnium compound represented by Formula 1 above is a $[N^{amido}, N, C^{aryl}]HfMe_2$-type composite including a 1, 2, 3, 4-tetrahydro-1,10-phenanthroline skeleton and a Hf—C(aryl) bond, which exhibits excellent alpha-olefin incorporation capacity in the polymerization of ethylene and an alpha-olefin. Particularly, the molecular weight of an olefin polymer or the content of alpha-olefin varies depending on the content of a chain transfer agent, which indicates that the compound is successfully used in CCTP and a β-elimination reaction has rarely occurred enough to be ignored. That is, it is possible to perform the polymerization of ethylene and an alpha-olefin-based monomer as living polymerization through CCTP using the hafnium compound represented by Formula 1 above, and a block copolymer having various block compositions may be successfully prepared.

In addition, it is possible to convert and perform CCTP using the hafnium compound into an anionic styrene polymerization reaction to synthesize a polyolefin-polystyrene block copolymer. As described above, the hafnium compound may be usefully used as a catalyst for preparing an olefin polymer, which is a unique feature that may be achieved with a novel structure of the hafnium compound represented by Formula 1 above.

Specifically, in Formula 1 above, $R_1$ to $R_{11}$ may each independently be hydrogen, an alkyl group having 1 to 20 carbon atoms, a cycloalkyl group having 3 to 20 carbon atoms, or an aryl group having 6 to 20 carbon atoms. Preferably, $R_1$ to $R_{10}$ may be hydrogen, and at the same time, $R_{11}$ may be hydrogen, an alkyl group having 1 to 20 carbon atoms, or an aryl group having 6 to 20 carbon atoms. More preferably, $R_1$ to $R_{10}$ may be hydrogen, and at the same time, $R_{11}$ may be hydrogen, or an alkyl group having 1 to 20 carbon atoms.

Alternatively, in Formula 1 above, $R_1$ to $R_{11}$ may each independently be hydrogen, an alkyl group having 1 to 20 carbon atoms, or an aryl group having 6 to 20 carbon atoms. At this time, $R_3$ and $R_4$ may be connected to each other to form an aromatic ring having 5 to 20 carbon atoms, such as a benzene ring. Preferably, $R_3$ and $R_4$ may be connected to each other to form a benzene ring, and at the same time, $R_1$ may be an alkyl group having 1 to 20 carbon atoms, or an aryl group having 6 to 20 carbon atoms.

Alternatively, in Formula 1 above, $R_1$, $R_2$, and $R_5$ to $R_{10}$ may be hydrogen, $R_3$, $R_4$, and $R_{11}$ may each independently be hydrogen, or an alkyl group having 1 to 20 carbon atoms, wherein $R_3$ and $R_4$ may be connected to each other to form an aromatic ring having 5 to 20 carbon atoms, for example, a benzene ring.

Meanwhile, $X_1$ and $X_2$ may each independently be hydrogen, an alkyl group having 1 to 20 carbon atoms, a cycloalkyl group having 3 to 20 carbon atoms, or an aryl group having 6 to 20 carbon atoms, and preferably, may each independently be an alkyl group having 1 to 20 carbon atoms, wherein $X_1$ and $X_2$ may be the same as each other.

In the present invention, the term "alkyl" means a hydrocarbon moiety of a linear chain or a branched chain.

In the present invention, the term "alkenyl" means an alkenyl group of a linear chain or a branched chain.

In the present invention, "aryl" preferably has 6 to 20 carbon atoms, and may specifically be phenyl, naphthyl, anthracenyl, dimethylanilinyl, anisolyl, and the like, but is not limited thereto.

In the present invention, "alkylaryl" means an aryl group substituted by the alkyl group above.

In the present invention, "arylalkyl" means an alkyl group substituted by the aryl group above.

In the present specification, "alkylsilyl" may be silyl substituted with alkyl having 1 to 20 carbon atoms, for example, trimethylsilyl or triethylsilyl.

In the present invention, "alkylamino" means an amino group substituted by the alkyl group above, for example, a dimethylamino group, a diethylamino group, and the like, but is not limited thereto.

In the present invention, unless otherwise stated, "hydrocarbyl" means a monovalent hydrocarbon group having 1 to 20 carbon atoms and consisting only of carbon and hydrogen, such as alkyl, aryl, alkenyl, alkynyl, cycloalkyl, alkylaryl or arylalkyl, regardless of the structure thereof.

More specifically, the hafnium compound represented by Formula 1 above may be a hafnium compound represented by Formula 1a or 1b below.

[Formula 1a]

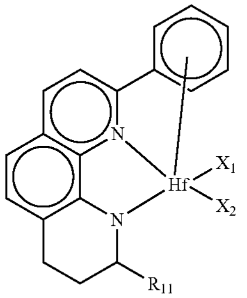

[Formula 1b]

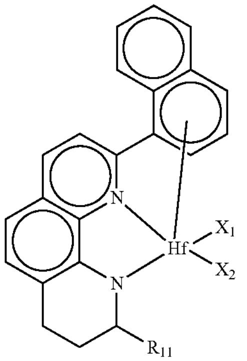

In Formula 1a and Formula 1b above, $R_{11}$ is hydrogen, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkoxy group having 7 to 20 carbon atoms, an alkoxy group having 1 to 20 carbon atoms, an alkylaryl group having 7 to 20 carbon atoms, an alkylsilyl group having 1 to 20 carbon atoms, or an arylalkyl group having 7 to 20 carbon atoms, and $X_1$ and $X_2$ are each independently hydrogen, halogen, a hydroxyl group, an amino group, a thio group, a silyl group, a cyano group, a nitro group, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms, a heteroaryl group having 5 to 20 carbon atoms, an alkoxy group having 1 to 20 carbon atoms, an aryloxy group having 6 to 20 carbon atoms, an alkylamino group having 1 to 20 carbon atoms, an arylamino group having 6 to 20 carbon atoms, an alkylthio group having 1 to 20 carbon atoms, an arylthio group having 6 to 20 carbon atoms, an alkylsilyl group having 1 to 20 carbon atoms, or an arylsilyl group having 6 to 20 carbon atoms.

The hafnium compound may be represented by any one among Formula 1-1 to Formula 1-5, but is not limited thereto. Any hafnium compound corresponding to Formula 1 is included in the present invention.

[Formula 1-1]

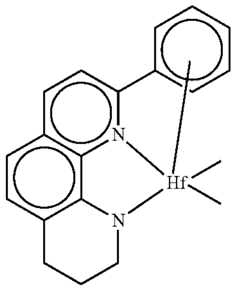

[Formula 1-2]

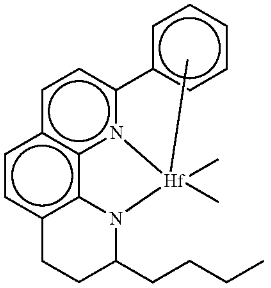

[Formula 1-3]

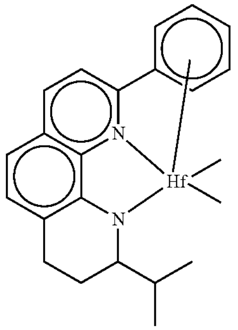

[Formula 1-4]

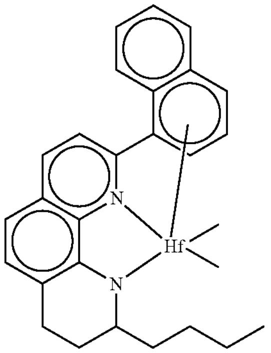

-continued

[Formula 1-5]

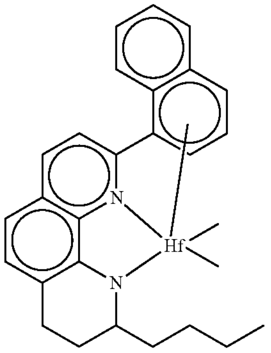

The hafnium compound of the present invention may be prepared by including a step of reacting a compound represented by Formula 2 below and a compound represented by Formula 3 below.

[Formula 2]

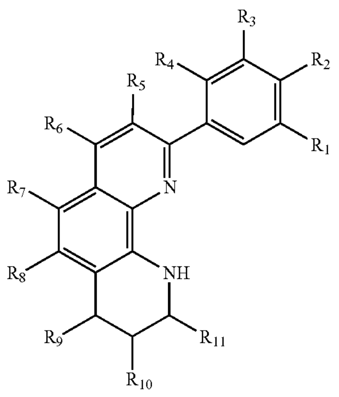

$Hf(X_1X_2)_2$ [Formula 3]

In the above formulas, the definitions of $R_1$ to $R_{11}$, and $X_1$ and $X_2$ are the same as described above.

Meanwhile, when a hafnium compound represented by Formula 1 above is prepared, depending on the structure of a finally prepared hafnium compound, a step of preparing a ligand compound may be performed differently as follows.

For example, when $R_3$ and $R_4$ do not form a ring with each other and $R_{11}$ is a hydrogen atom in a ligand compound, as shown below, the ligand compound may be prepared by hydrogenation under a ruthenium catalyst and then reacted with a compound represented by Formula 3, which is a hafnium precursor, to prepare a hafnium compound.

[Reaction Formula 1]

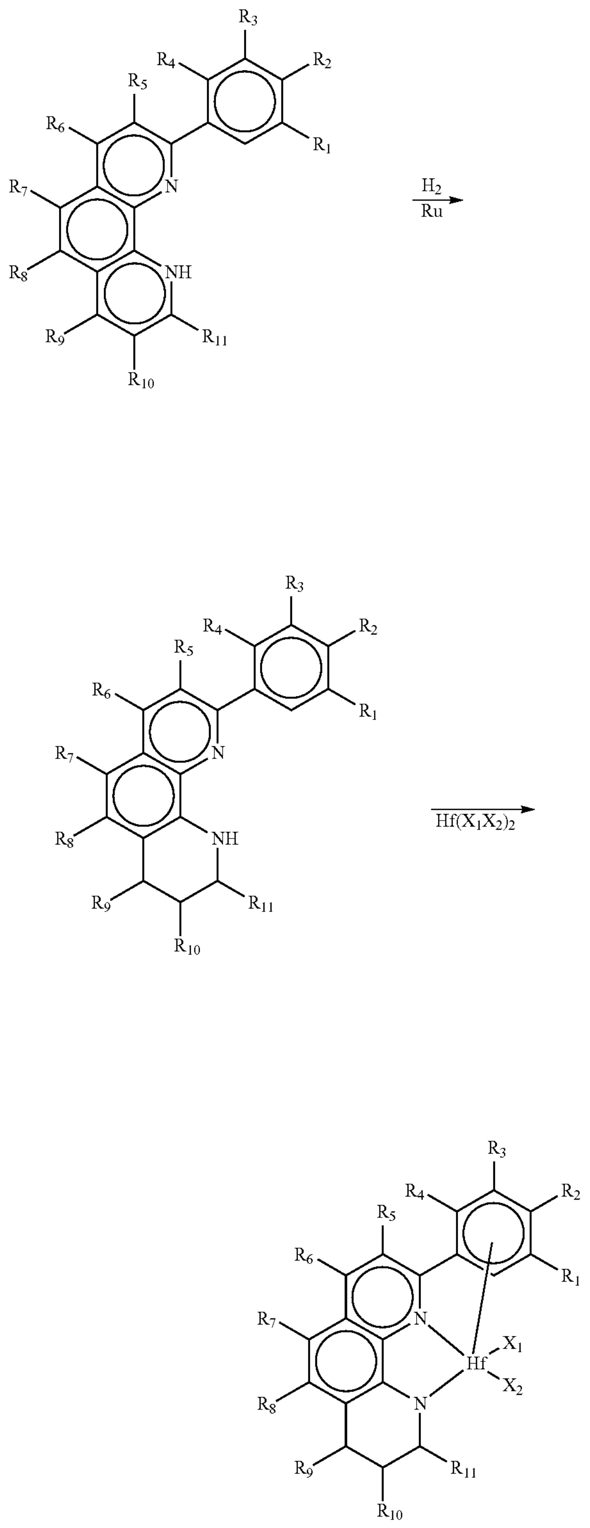

Alternatively, when $R_3$ and $R_4$ do not form a ring with each other and $R_{11}$ is a substituent, not a hydrogen atom, in a ligand compound structure, as shown in Reaction Formula 2 below, $R_{11}$ is first introduced using an organolithium compound and then hydrogenated under a ruthenium catalyst to prepare a ligand compound.

[Reaction Formula 2]

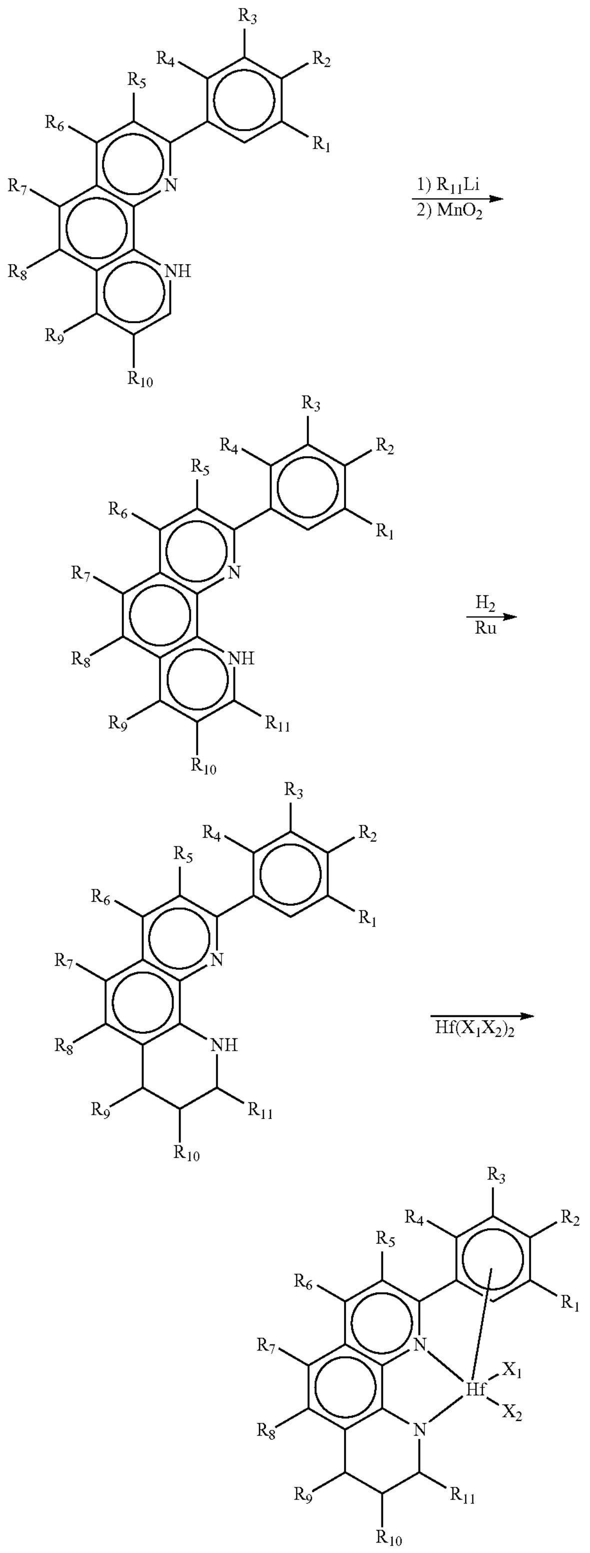

Alternatively, when $R_3$ and $R_4$ are connected to each other and form an aromatic ring having 5 to 20 carbon atoms and $R_{11}$ is a substituent, not a hydrogen atom, in a ligand compound structure, as shown below, $R_{11}$ may be first introduced using an organolithium compound and then, in order to prevent hydrogenation of an aromatic ring such as a naphthyl group, hydrogenated under a Pd/C catalyst to prepare a ligand compound.

[Reaction Formula 3]

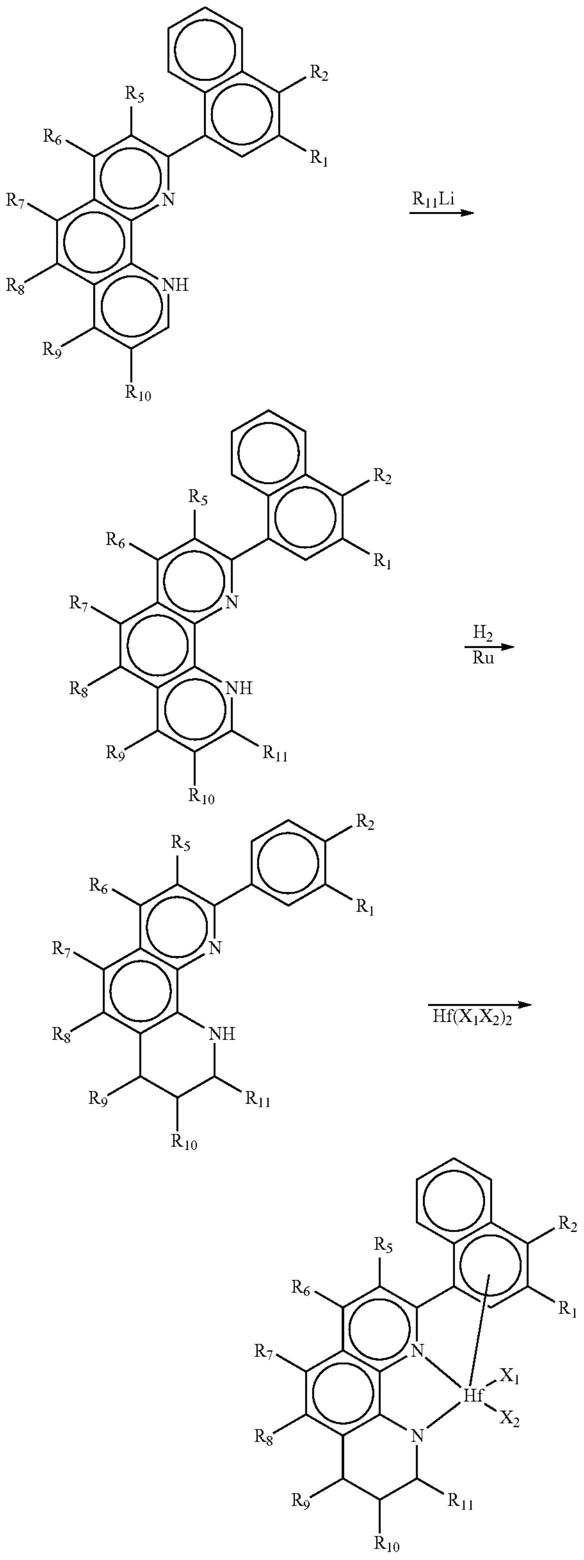

That is, the hafnium compound may be prepared by preparing a ligand compound through alkylation and hydrogenation of a compound, which is a precursor of a ligand compound, under suitable reagents and reaction conditions, and then introducing hafnium thereto. Specific types of alkylation reagents, reaction temperature and pressure, and the like may be appropriately changed by those skilled in the art in consideration of the structure and experimental conditions of a final compound.

In the present invention, the organozinc compound is a material used as a chain transfer agent which induces chain transfer during preparation in a polymerization reaction to allow a copolymer to be prepared, and may specifically be a compound represented by Formula 4 below.

[Formula 4]

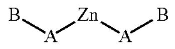

In Formula 4 above,

A is alkylene having 1 to 20 carbon atoms, arylene having 6 to 20 carbon atoms, or arylene having 6 to 20 carbon atoms substituted with halogen, alkyl having 1 to 12 carbon atoms, cycloalkyl having 3 to 12 carbon atoms, alkoxy having 1 to 8 carbon atoms, or aryl having 6 to 12 carbon atoms, and B is arylene having 6 to 12 carbon atoms substituted with alkenyl having 2 to 12 carbon atoms.

Alternatively, A may be alkylene having 1 to 12 carbon atoms, arylene having 6 to 12 carbon atoms, or arylene having 6 to 12 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and B may be arylene having 6 to 12 carbon atoms substituted with alkenyl having 2 to 8 carbon atoms.

Formula 4 may have a structure in which both ends of the formula are double bonds. For example, when B is arylene substituted with alkenyl, the arylene is connected to A and the double bond of the alkenyl substituted in the arylene may be located in the outermost portion of Formula 4.

When the organozinc compound is reacted with one or more kinds of olefin-based monomers in the presence of a catalyst composition, the olefin-based monomer may be inserted between zinc (Zn) and an organic group (A) of the organozinc compound to achieve polymerization.

The organozinc compound may be mixed in an amount of 1 to 200 equivalents based on 1 equivalent of a transition metal compound of Formula 1 above, specifically, in an amount of 10 to 100 equivalents based on 1 equivalent of the transition metal compound of Formula 1 above.

The organic zinc compound does not contain impurities such as THE and a large amount of magnesium salts, and thus, may be provided at high purity, and accordingly, may be used as a chain transfer agent, and is advantageous in olefin polymerization.

The catalyst composition may further include a co-catalyst compound. At this time, the co-catalyst compound serves to activate the transition metal compound represented by Formula 1, and as the co-catalyst, those known in the art may be used. For example, one or more selected from Formulas 5 to 7 below may be used as the co-catalyst.

$—[Al(R_a)—O]_m—$ [Formula 5]

$D(R_a)_3$ [Formula 6]

$[L\text{-}H]^+[Z(A)_4]-$ or $[L]^+[Z(A)_4]^-$ [Formula 7]

In the above formulas, $R_a$ is s each independently a halogen radical, a hydrocarbyl radical having 1 to 20 carbon atoms, or a hydrocarbyl radical having 1 to 20 carbon atoms substituted with halogen, m is an integer greater than or equal to 2, D is either aluminum or boron, L is a neutral or cationic Lewis acid, Z is a Group 13 element, A is each independently an aryl group having 6 to 20 carbon atoms in which one or more hydrogen atoms may be substituted with a substituent, or an alkyl group having 1 to 20 carbon atoms, and the substituent of A is halogen, hydrocarbyl having 1 to 20 carbon atoms, alkoxy having 1 to 20 carbon atoms, or aryloxy having 6 to 20 carbon atoms.

A compound represented by Formula 5 above is not particularly limited as long as it is alkylaluminoxane. Preferred examples thereof include methylaluminoxane, ethylaluminoxane, isobutylaluminoxane, butylaluminoxane and the like, and a particularly preferred compound is methylaluminoxane.

A compound represented by Formula 6 above is not particularly limited, but preferred examples thereof include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, tributylboron, and the like. A particularly preferred compound is selected from trimethylaluminum, triethylaluminum, and triisobutylaluminum.

Examples of a compound represented by Formula 7 above include, when Z is boron, for example, dioctadecylmethylammonium tetrakis(pentafluorophenyl)borate$[(C_{18}H_{37})_2N(H)Me]^+[B(C_6F_5)_4]^-$, dioctadecylmethylammonium tetrakis(phenyl)borate, dioctadecylmethylammonium tetrakis[3,5-bis(trifluoromethyl)phenyl]borate tetrakis(phenyl)borate, triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilidium tetraphenylborate, N,N-diethylanilidium tetrapentafluorophenylborate, diethylammonium tetrapentafluorophenylborate, triphenylphosphonium tetraphenylborate, trimethylphosphonium tetraphenylborate, trimethylammonium tetraphenylborate, tripropylammonium tetraphenylborate, trimethylammonium tetra(p-tolyl)borate, tripropylammonium tetra(p-tolyl)borate, triethylammonium tetra(o,p-dimethylphenyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, triphenylcarbonium tetra(p-trifluoromethylphenyl)borate, triphenylcarbonium tetrapentafluorophenylborate, or a combination thereof, and when Z is aluminum, for example, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetraphenylaluminum, N,N-diethylanilinium tetrapentafluorophenylaluminum, diethylammonuim tetrapentafluorophenylaluminium, triphenylphosphonium tetraphenylaluminum, trimethylphosphonium tetraphenylaluminum, triethylammonium tetraphenylaluminum, tributylammonium tetraphenylaluminum, or a combination thereof, but is not limited thereto.

Particularly, a co-catalyst used in the present invention may be a compound represented by Formula 7 above, and may specifically be dioctadecylmethylammonium tetrakis(pentafluorophenyl)borate.

In addition, the co-catalyst used in the present invention may be prepared in an anhydrous hydrocarbon solvent. For example, the hydrocarbon solvent may be one or more selected from the group consisting of butane, pentane, neopentane, hexane, cyclohexane, methylcyclohexane, heptane, octane, benzene, toluene, xylene, and ethylbenzene, but is not limited thereto. Any hydrocarbon solvent available in the art may be used in an anhydrous form.

In the present invention, when the co-catalyst is prepared in an anhydrous hydrocarbon solvent, in 1H NMR spectrum, at least one peak appears in each of the range of 1.75 ppm to 1.90 ppm and the range of 1.90 ppm to 2.00 ppm. This indicates that protons attached to x-carbon adjacent to nitrogen, sulfur, or phosphorus included in L show different peaks. For example, when a compound represented by Formula 1 is $[(C_{18}H_{37})_2N(H)Me]^+[B(C_6F_5)_4]^-$, in the $^1H$ NMR spectrum thereof, two protons present in $NCH_2$ may each show a different signal.

In addition, the hafnium represented by Formula 1 and the co-catalyst may also be used in the form of being supported on a carrier. The carrier may be silica or alumina, but is not limited thereto.

An olefin monomer introduced as a reaction material in Step (S1) may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicosene, or a monomer formed of a mixture thereof, and the like. The olefin monomer may be used alone, or in combination of two or more thereof.

Step (S1) may be performed, for example, in a uniform solution state. At this time, as a solvent, a hydrocarbon solvent or olefin monomer itself may be used as a medium. The hydrocarbon solvent may be an aliphatic hydrocarbon solvent having 4 to 20 carbon atoms, specifically isobutane, hexane, cyclohexane, methylcyclohexane, and the like. The solvent may be used alone, or in combination of two or more thereof.

The polymerization temperature of Step (S1) may vary depending on reaction materials, reaction conditions, and the like, but may specifically be 70 to 170° C., specifically 80 to 150° C., or 90 to 120° C. Within the above range, the solubility of a polymer may be increased and a catalyst may be thermally stabilized.

The polymerization of Step (S1) may be performed in a batch, semi-continuous, or continuous manner, and may also be performed in two or more steps having different reaction conditions.

A compound prepared by the above-described Step (S1) may serve as a precursor for preparing the polyolefin-polystyrene-based multi-block copolymer of the present invention by an anionic polymerization reaction of Step (S2) to be described later.

Step (S2)

Step (S2) is a step performed in succession to Step (S1) and forming a polystyrene block by anionic polymerization of the polyolefin block and a styrene-based monomer in the presence of an alkyl lithium compound including silicon atom and a triamine compound to prepare a polyolefin-polystyrene-based multi-block copolymer.

In Step (S2), a styrene-based monomer may be continuously inserted between a zinc-carbon bond of (polyolefinyl) $_2$Zn included in the compound formed by the above-described Step (S1), and at the same time, a styrene group present in a terminal of the compound formed by Step (S1) may participate as a copolymerization site with the styrene-based monomer to be connected to a polystyrene chain. In addition, a multi-block copolymer prepared through the above process may be easily quenched by the reaction of an end group with water, oxygen, or an organic acid, through which the multi-block copolymer is converted into an industrially useful polyolefin-polystyrene-based multi-block copolymer.

The styrene-based monomer may be a styrene-based monomer having 6 to 20 carbon atoms. More specifically, the styrene-based monomer may be a styrene-based monomer including ethylene substituted with an aryl group having 6 to 20 carbon atoms, ethylene substituted with a phenyl group, and the like, for example, styrene.

The alkyl lithium compound including silicon atom may be a compound represented by Formula 8 below.

$(CH_3)_3Si(CH_2)Li$ [Formula 8]

The alkyl lithium compound including the silicon atom is a material widely used as an initiator of anionic polymerization, and is readily available to be used in the present invention.

The triamine compound may be a compound represented by Formula 9 below.

[Formula 9]

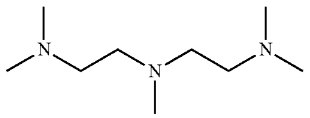

The triamine compound is a compound used for the purpose of improving the reactivity as a base or as a nucleophile of the alkyl lithium compound by coordinating well with lithium, and is readily available and inexpensive.

The present invention newly uses the compounds of Formulas 8 and 9 (e.g., $Me_3SiCH_2Li$•(PMDETA)) as an initiator of Step (S2), and thus, may suppress the generation amount of a polystyrene homopolymer, a polyolefin homopolymer, and a polyolefin-polystyrene diblock copolymer, and maximize the generation of a polyolefin-polystyrene-based multi-block copolymer, which is the object of the present invention.

The alkyl lithium compound including silicon atom and represented by Formula 8 and the triamine compound represented by Formula 9 may be mixed and introduced to an aliphatic hydrocarbon solvent, or the alkyl lithium compound including silicon atom and represented by Formula 8 and the triamine compound represented by Formula 9 may be sequentially introduced.

The anionic polymerization temperature of Step (S2) may vary depending on reaction materials, reaction conditions, and the like, but may specifically be 40 to 170° C., more specifically 60 to 150° C., or 90 to 100° C.

The anionic polymerization of Step (S2) may be performed in a batch, semi-continuous, or continuous manner, and may also be performed in two or more steps having different reaction conditions.

The anionic polymerization time of Step (S2) may vary depending on reaction materials, reaction conditions, and the like, but may specifically be 0.5 to 10 hours, 1 to 8 hours, 2 to 7 hours, or 4 to 6 hours. When within the above range, it is advantageous to convert the total amount of introduced styrene-based monomers into multi-block copolymers.

As described above, in the preparation method of the present invention, a polyolefin chain is grown through olefin polymerization using the above-described organozinc compound represented by Formula 4 above, and then styrene anionic polymerization is continuously performed to prepare a polyolefin-polystyrene-based multi-block copolymer, through which it is possible to efficiently prepare a polyolefin-polystyrene-based multi-block copolymer having improved physical properties compared to the prior art, and thus, may be easily used in the industry.

The method for preparing a polyolefin-polystyrene-based multi-block copolymer according to an example of the present invention is different from a typical method for preparing a polyolefin-polystyrene-based multi-block copolymer, in which styrene and diene are subjected to anionic polymerization, followed by a two-step process of hydrogenation, and is characterized in that a polyolefin-polystyrene-based multi-block copolymer is prepared without a hydrogenation reaction on a double bond in a copolymer main chain. Accordingly, a polyolefin-polystyrene-based multi-block copolymer included in the thermoplastic resin composition of the present invention is characterized in that the polyolefin-polystyrene-based multi-block copolymer does not contain an unsaturated bond which is not saturated and is present during a hydrogenation process for a double bond of a main chain.

Meanwhile, in order to satisfy the use and physical properties required accordingly, the thermoplastic resin composition according to an embodiment of the present invention having the above-described composition may include each component in an appropriate content. For example, in the present invention, the thermoplastic resin composition may include the (1) polypropylene and the (2) polyolefin-polystyrene-based multi-block copolymer in a weight ratio of 10:90 to 90:10, specifically in a weight ratio of 20:80 to 80:20, more specifically, in a weight ratio of 40:60 to 60:40.

When the content of the polyolefin-polystyrene-based multi-block copolymer included in the thermoplastic resin composition is too small, the impact strength may be degraded, and when the content the polyolefin-polystyrene-based multi-block copolymer is excessive, the fluidity of the thermoplastic resin composition may be degraded. The mixing ratio may be controlled in consideration of the significance of the physical properties of the polypropylene and the polyolefin-polystyrene-based multi-block copolymer.

The thermoplastic resin composition according an embodiment of the present invention may selectively further include an inorganic filler together with the polypropylene and the polyolefin-polystyrene-based multi-block copolymer to improve the mechanical properties of the thermoplastic resin composition.

The inorganic filler may be a powder-type filler, a flake-type filler, a fibrous filler, or a balloon-type filler, and any one thereof or a mixture of two or more thereof may be used. Specifically, the powder-type filler may be a natural silicic acid or silicate such as fine powder talc, kaolinite, calcined clay, or sericite, a carbonate such as a precipitated calcium carbonate, a heavy calcium carbonate or a magnesium carbonate, a hydroxide such as an aluminum hydroxide or a magnesium hydroxide, an oxide such as a zinc oxide, a magnesium oxide, or a titanium a synthetic silicic acid or silicate such as a hydrous calcium silicate, a hydrous aluminum silicate, a hydrous silicic acid or an silicic anhydride, and silicon carbide, and the like. In addition, the flake-type filler may be mica, and the like. The fibrous filler may be a basic sulfuric acid magnesium whisker, a calcium titanate whisker, a boric acid aluminum whisker, sepiolite, processed mineral fiber (PMF), potassium titanate, or the like. In addition, the balloon-type filler may be a glass balloon and the like. Among the above, the inorganic filler may be talc.

In addition, the inorganic filler may be surface-treated to improve the strength properties and molding processability of the thermoplastic resin composition.

Specifically, the inorganic filler may be physically or chemically surface-treated using a surface treatment agent such as a silane coupling agent, a higher fatty acid, a fatty acid metal salt, an unsaturated organic acid, an organic titanate, a resin acid, or polyethylene glycol.

In addition, the average particle diameter ($D_{50}$) of the inorganic filler may be 1 μm to 20 μm, specifically 3 μm to 15 μm, more specifically 5 μm to 10 μm. When the average particle diameter of the inorganic filler is too small, it is difficult to achieve uniform dispersion when mixed with polypropylene and a polyolefin-polystyrene-based multi-block copolymer due to the aggregation between inorganic filler particles, and as a result, the effect of improving the mechanical properties of the thermoplastic resin composition may be insignificant. In addition, when the average particle diameter of the inorganic filler is excessive, there is a risk of physical properties degradation due to the degradation in the dispersibility of the inorganic filler itself.

In the present invention, the average particle diameter ($D_{50}$) of the inorganic filler may be defined as a particle diameter at 50% of a particle diameter distribution. In the present invention, the average particle diameter ($D_{50}$) of the inorganic filler may be measured, for example, by electron microscopy using a scanning electron microscope (SEM) or a field emission scanning electron microscopy (FE-SEM), or by a laser diffraction method. Specifically, when measured by a laser diffraction method, inorganic filler particles may be dispersed in a dispersion medium, and then introduced into a commercially available laser diffraction particle size measuring device (e.g., Microtrac MT 3000) to measure the average particle diameter ($D_{50}$) at 50% of a particle size distribution in the measuring device.

The above-described inorganic filler may be included in an amount of 0.1 parts by weight to 40 parts by weight based on 100 parts by weight of the thermoplastic resin composition. When the content of the inorganic filler in a thermoplastic resin composition is less than 0.1 parts by weight based on 100 parts by weight of the thermoplastic resin composition, the improvement effect according to the inclusion of the inorganic filler is insignificant, and when greater than 40 parts by weight, the processability of the thermoplastic resin composition may be degraded. More specifically, the inorganic filler may be included in an amount of 0.1 wt % to 20 wt % based on total weight of the thermoplastic resin composition.

The thermoplastic resin composition according to an embodiment of the present invention which satisfies the above-described composition and content conditions may be prepared by adding polypropylene and selectively an inorganic filler to a polyolefin-polystyrene-based multi-block copolymer, followed by performing heat treatment. At this time, the type and the content of the polypropylene are the same as described above.

The mixing process may be performed according to a typical method. Specifically, the mixing may be performed using a super mixer or a ribbon mixer.

In addition, as required in the mixing process, an additive such as an antioxidant, a thermal stabilizer, a UV stabilizer, an antistatic agent, and the like may be further included, and in order to improve paintability, a small amount of adhesive resin or an additive having polar group may be selectively further used within an appropriate content range.

In addition, the heat treatment process may be performed at a temperature above the melting point of polypropylene and 210° C. or below. The heat treatment process may be performed using various blending processing devices such as a twin-screw extruder, a single-screw extruder, a roll-mill, a kneader, or a banbury mixer.

The thermoplastic resin composition according to an embodiment of the present invention prepared according to the preparation method as described above may have excellent elongation and tensile strength and exhibit high fluidity properties.

Specifically, the thermoplastic resin composition may satisfy the physical properties of the following (A) to (E).

(A) Tensile strength of 10 to 35 MPa, (B) Elongation of 20 to 1500%, (C) Yield strength of 5 to 25 MPa, (D) Melt flow rate (MFR, 230° C. and 2.16 kg) of 0.5 to 200 g/10 min, and (E) Melt flow rate (MFR, 190° C. and 2.16 kg) of 2 to 100 g/10 min.

(A) The tensile strength may be 10 to 35 MPa, specifically 15 to 30 MPa, more specifically 17 to 30 MPa.

(B) The elongation may be 20 to 1500%, specifically 30 to 1400%, more specifically 50% to 1300%.

(C) The yield strength may be 5 to 25 MPa, specifically 7 to 22 MPa, more specifically 9 to 20 MPa.

The tensile strength, elongation, and yield strength may be measured according to ASTM D638 (50 mm/min), and represent tensile strength at break, elongation at break, and strength of a yield point, respectively.

(D) The melt flow rate (MFR, 230° C. and 2.16 kg) may be 0.5 to 200 g/10 min, specifically 3 to 150 g/10 min, and more specifically 7 to 130 g/10 min.

(E) The melt flow rate (MFR, 190° C. and 2.16 kg) may be 2 to 100 g/10 min, specifically 2 to 80 g/10 min, and more specifically 2 to 50 g/10 min.

The melt flow rates were measured under the conditions of 230° C. and a 2.16 kg load and 190° C. and a 2.16 kg load, respectively, according to ASTM-D 1238.

The thermoplastic resin composition according to an embodiment of the present invention is useful for hollow molding, extrusion molding, or injection molding in various fields and applications for packaging, construction, household products, and the like, such as materials for automobiles, electric wires, toys, textiles, or medical products.

Particularly, the thermoplastic resin composition has excellent toughness and impact strength at a low temperature as well as room temperature, and also has excellent physical properties such as heat resistance and rigidity, and thus, may be usefully used for interior and exterior parts of automobiles.

According to another embodiment of the present invention, there are provided a molded body and an automotive part manufactured by using a thermoplastic resin composition satisfying the above-described physical property requirements.

The molded body may specifically be a blow molding molded body, an inflation molded body, a cast molded body, an extrusion laminate molded body, an extrusion molded body, a foam molded body, an injection molded body, a sheet, a film, a fiber, a monofilament, a non-woven fabric, or the like.

In addition, the automotive part may be interior exterior parts for automobiles, and the like.

EXAMPLES

Hereinafter, the present invention will be described in detail with reference to examples. However, the following examples are merely illustrative of the present invention and are not intended to limit the scope of the present invention.

<Preparation of Transition Metal Compound>

Preparation Example 1

(i) Preparation of Ligand Compound

Isopropyllithium (0.45 mL, 0.36 mmol, 0.79 M in pentane) was slowly added to 2-naphthyl-1,10-phenanthroline (0.789 g, 2.58 mmol) in toluene (8 mL) at −10° C. After performing stirring at room temperature for 3 hours, degassed $H_2O$ (3 mL) was added. The aqueous layer was removed by a syringe under $N_2$. The solvent was removed using a vacuum line, and the residue was dissolved in degassed ethanol (15 mL) and THE (5 mL). The solution was transferred to a bomb reactor containing Pd/C (0.242 mmol, 10 mol %) under $N_2$. After $H_2$ gas was charged to 5 bar, the mixture was stirred at room temperature for 12 hours. The $H_2$ gas was released and the catalyst residue was filtered on celite and removed. The solvent was removed, and the residue was purified by silica gel column chromatography using ethyl acetate/hexane (1/3, v/v). A pale yellow sticky solid was obtained (0.085 g, 73%). $^1H$ NMR and $^{13}C$ NMR spectra are shown in FIG. 1.

$^1H$ NMR ($C_6D_6$): δ 8.58 (d, J=7.8 Hz, H), 7.75 (d, J=9.0 Hz, H), 7.70 (d, J=9.6 Hz, H), 7.66 (d, J=7.2 Hz, H), 7.63 (d, J=6.6 Hz, H), 7.32 (m, 4H), 7.18 (d, J=8.4 Hz, H), 6.99 (d, J=7.8 Hz, H), 6.39 (s, H, NH), 2.93 (m, H), 2.79 (m, H), 2.70 (dt, J=4.8 Hz, H), 1.70 (m, H), 1.63 (m, H), 1.47 (m, H), 0.81 (d, J=7.2 Hz, 3H, $CH(CH_3)_2$), 0.76 (d, J=7.2 Hz, 3H, $CH(CH_3)_2$) ppm.

$^{13}C\{^1H\}$ NMR ($C_6D_6$): δ 18.34, 18.77, 24.43, 26.78, 32.52, 56.73, 112.78, 116.67, 122.62, 125.59, 126.10, 126.51, 126.61, 126.86, 128.14, 128.69, 129.03, 129.28, 132.20, 134.71, 136.41, 137.64, 139.79, 141.75, 155.92 ppm.

m/z calcd ([$M^+$] $C_{25}H_{24}N_2$) 352.4800. Found: 352.1942.

(ii) Preparation of Transition Metal Compound

[Formula 1-3]

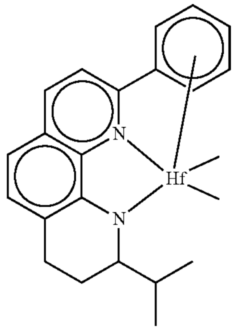

Figure 2:
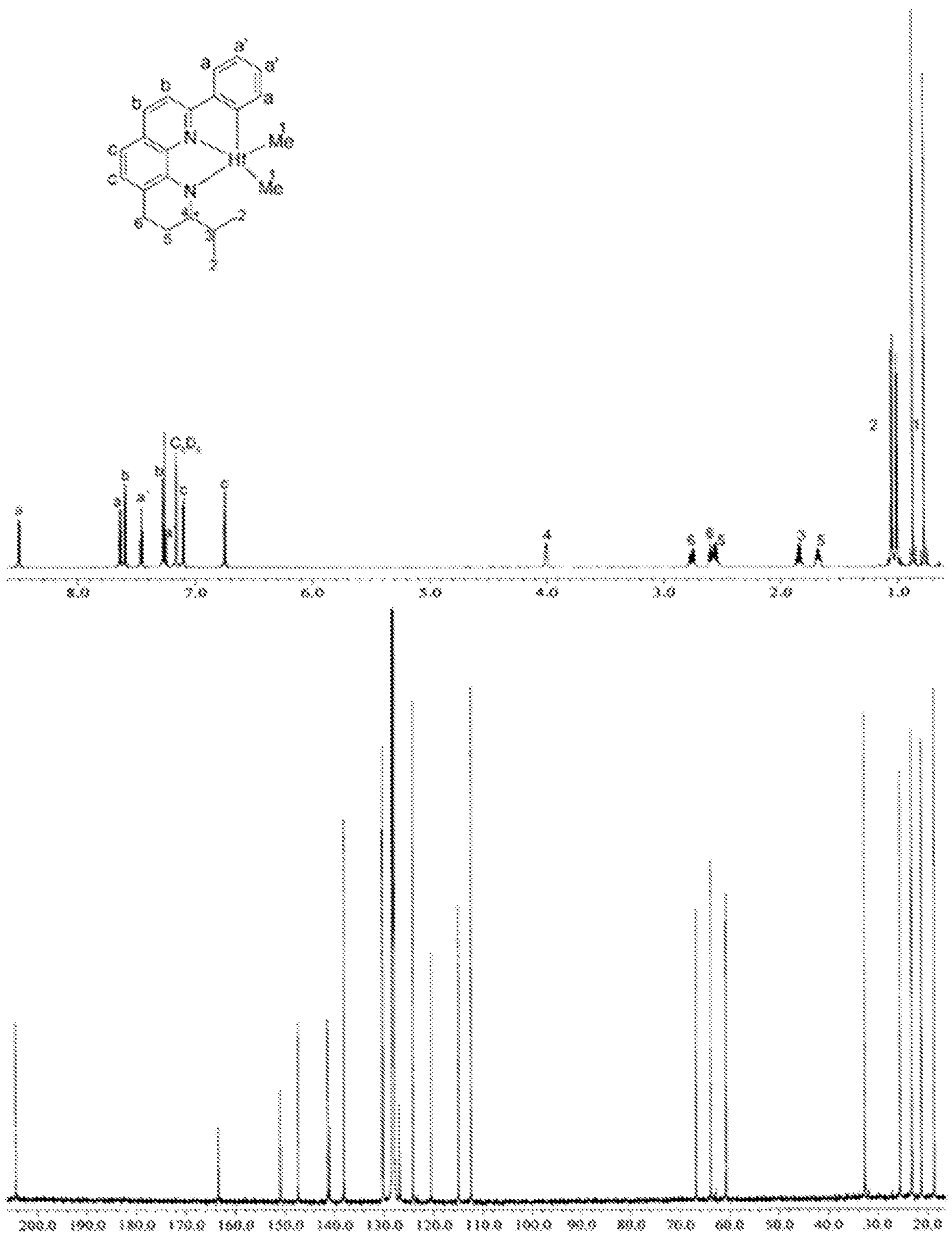
FIG. 2 shows $^{1}H$ NMR and $^{13}C$ NMR spectra of a transition metal compound used in the preparation of a polyolefin-polystyrene-based multi-block copolymer included in a thermoplastic resin composition according to an embodiment of the present invention.

MeMgBr (1.24 mL, 3.11 M in diethyl ether) was added dropwise to a stirred suspension (0.300 g, 0.938 mmol) of $HfCl_4$ in toluene (8 mL) at −78° C. After performing stirring for 1 hour at a temperature in the range of −40° C. and −35° C., the solution was cooled to −78° C. again. A solution (0.24 g, 0.94 mmol) of a ligand compound (0.366 g, 1.00 mmol) in toluene (4 mL) was added dropwise. The resulting solution was stirred for 2 hours at a controlled temperature in the range of −40° C. and −35° C., and then stirred at room temperature overnight. The solvent was removed using a vacuum line, and the residue was extracted with toluene (50 mL). Dark brown powder (0.226 g, 47%) was obtained by performing pulverization in hexane. $^1H$ NMR and $^{13}C$ NMR spectra are shown in FIG. 2.

$^1H$ NMR ($C_6D_6$): δ 8.66 (d, J=7.8 Hz, H), 8.50 (d, J=7.8 Hz, H), 7.92 (d, J=9.0 Hz, H), 7.83 (d, J=7.2 Hz, H), 7.76 (d, J=8.4 Hz, H), 7.62 (d, J=7.8 Hz, H), 7.40 (td, J=7.2 Hz, H), 7.32 (m, H), 7.14 (d, J=7.8 Hz, H), 6.77 (d, J=7.2 Hz, H), 4.02 (m, H), 2.80 (m, H), 2.62 (dt, J=6.0 Hz, H), 2.55 (m, H), 1.88 (m, H), 1.72 (m, H), 1.09 and 1.04 (d, J=6.6 Hz, 6H, $CH(CH_3)_2$), 0.82 (s, 3H, $HfCH_3$), 0.81 (s, 3H, $HfCH_3$) ppm.

$^{13}C\{^1H\}$ NMR ($C_6D_6$): δ 18.55, 21.28, 23.07, 25.44, 32.58, 60.98, 63.06, 66.88, 112.37, 119.64, 120.21, 124.55, 125.48, 126.81, 126.97, 129.31, 129.97, 130.26, 131.25, 133.82, 135.51, 140.97, 141.44, 143.94, 150.14, 164.58, 209.13 ppm.

Anal. Calcd. ($C_{27}H_{28}HfN_2$): C, 58.01; H, 5.05; N, 5.01%. Found: C, 57.91; H, 5.01; N, 5.11%.

<Preparation of Co-Catalyst>

Excess $K^+[B(C_6F_5)_4]^-$ (0.633 g, 0.881 mmol, assuming pure) was reacted with a solution of $[(C_{18}H_{37})_2N(H)Me]^+[Cl]^-$ (0.404 g, 0.705 mmol) in toluene (anhydrous, 10 mL) for 1 hour at room temperature in a glove box. After filtered on celite, the solvent was removed using a vacuum line. The residue was dissolved in methylcyclohexane (4 mL) and then filtered again on celite. The solvent was removed to produce a yellow oil compound, which was used without further purification (0.797 g, 93%).

$^1H$ NMR ($C_6D_6$): δ 3.15 (br, H, NH), 1.97 (m, 2H, $NCH_2$), 1.80 (m, H, $NCH_2$), 1.51 (d, J=6.0 Hz, 3H, $NCH_3$), 1.45-1.29 (m, 48H), 1.26 (quintet, J=7.2 Hz, 4H), 1.13 (quintet, J=7.2 Hz, 4H), 0.94 (t, J=7.8 Hz, 6H), 0.88 (quintet, J=7.8 Hz, 4H), 0.81 (m, 4H) ppm.

$^{19}F$ NMR ($C_6D_6$): δ −132.09, —161.75, −165.98.

<Preparation of Organozinc Compound>

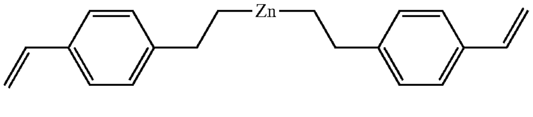

Borane dimethyl sulfide (1.6 mL, 3.2 mmol) was slowly introduced to triethylborane (0.6 g) in stirring and then reacted for 90 minutes. The mixture was slowly introduced to divinylbenzene (3.8 g) dissolved in anhydrous diethylether (10 mL) cooled to −20° C. and then stirred overnight. The solvent was removed with a vacuum pump and then diethylzinc (0.8 g) was added. The reaction was performed at 0° C. for 5 hours while removing triethylborane generated through distillation under reduced pressure. At 40° C., excess divinylbenzene and diethylzinc were removed by distillation n under reduced pressure. Methylcyclohexane (150 mL) was added to dissolve the product again, and then a solid compound produced as a by-product was filtered using celite and removed to prepare an organozinc compound represented by the above formula.

<Preparation of Polyolefin-Polystyrene-Based Multi-Block Copolymer>

Implemented Preparation Example 1

A Parr reactor (1 gallon) was vacuum-dried at 120° C. for 2 hours. A solution of $Oc_3Al$ (trioctylaluminum, 1466.4 mg, 1,000 μmol-Al) in methylcyclohexane (1, 200 g) was added to the reactor. The mixture was stirred at 120° C. for 1 hour using a heating jacket, and then the solution was removed using a cannula.

The reactor was filled with methylcyclohexane (600 g) containing $Oc_3Al$ (715.6 mg, 488 μmol-Al/25 wt % in hexane) as a scavenger, and was filled with 1-hexene (280 g) as an olefin monomer, and the temperature was set to 90° C. A solution of the organozinc compound (3,000 μmol) in methylcyclohexane (3.85 g) was filled as a chain transfer agent, and then a methylcyclohexane solution (1.68 g) containing the transition metal compound (9.0 μmol-Hf) of Preparation Example 1 activated with $[(C_{18}H_{37})_2N(H)Me]^+[B(C_6F_5)_4]^-$ (9.0 μmol) in methylcyclohexane was injected. Polymerization was performed for 40 minutes while maintaining the pressure in the reactor at 25 bar by opening a valve of an ethylene tank. The temperature was adjusted within the range of 90 to 120° C., and the remaining ethylene gas was discharged.

When the temperature reached 90° C., a $Me_3SiCH_2Li$•(PMDETA) solution prepared by mixing $Me_3SiCH_2Li$ (244.8 mg, 2.6 mmol) PMDETA (495.1 mg, 2.86 mmol) in methylcyclohexane (3.85 g) was added. The temperature was maintained at 90° C. for 30 minutes during stirring, and then styrene (88.0 g) was injected. The temperature was adjusted in the range of 90 to 100° C. using a heating jacket.

From the 1H NMR analysis of an aliquot, complete conversion of styrene was confirmed. After the complete conversion of styrene, 2-ethylhexanoic acid and ethanol were continuously injected. An obtained polymer mass (300 g) was dried overnight in a vacuum oven at 80° C.

Implemented Preparation Example 2

A polymer mass (360 g) was obtained and dried overnight in a vacuum oven at 80° C. in the same manner as in Implemented Preparation Example 1 except that methylcyclohexane (1, 200 g) containing MMAO-3A (1,000 μmol-Al/in heptane) was used as a scavenger, and 1-hexene (560 g) as an olefin monomer, an organozinc compound (3,100 μmol) in methylcyclohexane (3.85 g) as a chain transfer agent, a methylcyclohexane solution (3.6 g) containing the transition metal compound (12.0 μmol-Hf) of Preparation Example 1 activated with $[(C_{18}H_{37})_2N(H)Me]^+[B(C_6F_5)_4]-$ (12.0 μmol) in methylcyclohexane, and styrene (104.0 g) were used in different amounts in the reactor and the valve of the ethylene tank was opened to allow the pressure in the reactor to be 20 bar.

Comparative Preparation Example 1

As the commercially obtained SEBS, G1651 of Kraton Company was used.

Comparative Preparation Example 2

As the commercially obtained SEBS, G1650 of Kraton Company was used.

TABLE 1

| | Catalyst type | Catalyst input amount (umol) | Co-catalyst (umol) | Zn (umol) | Alpha-olefin Type | Alpha-olefin Input amount | Styrene (g) | Chain transfer reaction temperature time |
|---|---|---|---|---|---|---|---|---|
| Implemented Preparation Example 1 | Formula 1-3 | 9 | 9 | 3,000 | 1-hexene | 280 g | 88 | 90 to 120° C., 40 min |
| Implemented Preparation Example 2 | Formula 1-3 | 12 | 12 | 3,100 | 1-hexene | 560 g | 104 | 90 to 120° C., 40 min |
| Comparative Preparation Example 1 | | | | Commercial SEBS (G1651) | | | | |
| Comparative Preparation Example 2 | | | | Commercial SEBS (G1650) | | | | |

Experimental Example 1

For the polyolefin-polystyrene-based multi-block copolymers of Implemented Preparation Examples, the physical properties of each of the copolymer were measured according to the following conditions and methods, and the results are shown in Table 2 below.

(1) Measurement of Content of Ethylene, Alpha-Olefin, and Styrene

The measurement was performed through nuclear magnetic resonance (NMR). Using Bruker 600 MHz AVANCE III HD NMR device, $^1H$ NMR was measured under the condition of ns=16, d1=3s, solvent=TCE-d2, and 373K, and then the TCE-d2 solvent peak was calibrated to 6.0 ppm.

$CH_3$ of 1-propylene was confirmed at 1 ppm and a $CH_3$-related peak (triplet) of a butyl branch by 1-hexene was confirmed near 0.96 ppm to calculate the contents. In addition, the content of styrene was calculated using an aromatic peak near 6.5 to 7.5 ppm.

(2) Weight Average Molecular Weight (Mw, g/Mol) and Polydispersity Index (PDI)

The weight average molecular weight (Mw, g/mol) and the number average molecular weight (Mn, g/mol) were measured by gel permeation chromatography (GPC), respectively, and the weight average molecular weight was divided by the number average molecular weight to calculate the polydispersity index (PDI).

Column: PL Olexis
Solvent: TCB (trichlorobenzene)
Flow rate: 1.0 ml/min
Sample concentration: 1.0 mg/ml
Injection amount: 200 μl
Column temperature: 160° C.
Detector: Agilent High Temperature RI detector
Standard: Polystyrene
Calculate molecular weight by Universal calibration using the Mark-Houwink equation ($K=40.8\times10^{-5}$, $\alpha=0.7057$)

(3) Complex Viscosity

The complex viscosity was measured using the Advanced Rheometric Expansion System Specification of TA Instruments. A sample was allowed to have a gap of 2.0 mm at 160° C. using parallel plates with a diameter of 25.0 mm. The measurement was carried out in a dynamic strain frequency sweep mode with a strain of 5% and a frequency of 0.05 rad/s to 500 rad/s, and a total of 41 points were measured by 10 points in each decade. Complex viscosities at frequencies of 0.5 rad/s and 125 rad/s are shown in Table 2 below.

TABLE 2

| | Composition | | | GPC | | Complex viscosity | |
|---|---|---|---|---|---|---|---|
| | Ethylene (wt %) | Alpha-olefin (wt %) | Styrene (wt %) | Mw (g/mol) | PDI | 0.5 (rad/s) | 125 (rad/s) |
| Implemented Preparation Example 1 | 43.6 | 23.7 | 32.6 | 255,000 | 2.1 | 109,180 | 1106.25 |
| Implemented Preparation Example 2 | 43.3 | 31.1 | 25.6 | 144,000 | 1.7 | 336,245 | 3,480.51 |
| Comparative Preparation Example 1 | 43.4 | 24.8 | 31.9 | 139,000 | 1.1 | 484,547 | 3,216.27 |
| Comparative Preparation Example 2 | 44.3 | 26.2 | 29.5 | 54,000 | 1.1 | 830,596 | 6,538.66 |

Example 1—Preparation of Thermoplastic Resin Composition

To 20 parts by weight of the polyolefin-polystyrene-based multi-block copolymer prepared in Implemented Preparation Example 1 above, 80 parts by weight of highly crystalline impact copolymer polypropylene (CB5230, product of Korea Petrochemical Ind. Co., LTD) having a melt index (230° C., 2.16 kg) of 30 g/10 min was added, and then solution blending was performed in xylene using a reactor to prepare a thermoplastic resin composition compound. At this time, the temperature was 200° C. to 230° C., the impeller rotation speed was 400 rpm, and the blending time was 4 hours. After the blending was finished, the compound was recovered and then dried overnight in a 100° C. vacuum oven.

Examples 2—Preparation of Thermoplastic Resin Composition

A thermoplastic resin composition compound was prepared in the same manner as in Example 1 except that the content of the polyolefin-polystyrene-based multi-block copolymer prepared in Implemented Preparation Example 1 and the content of the highly crystalline impact copolymer polypropylene were respectively changed to 50 parts by weight and 50 parts by weight.

Examples 3: Preparation of Thermoplastic Resin Composition

A thermoplastic resin composition compound was prepared in the same manner as in Example 1 except that the polyolefin-polystyrene-based multi-block copolymer prepared in Implemented Preparation Example 2 was used instead of the polyolefin-polystyrene-based multi-block copolymer prepared in Implemented Preparation Example 1.

Example 4—Preparation of Thermoplastic Resin Composition

A thermoplastic resin composition compound was prepared in the same manner as in Example 2 except that the polyolefin-polystyrene-based multi-block copolymer prepared in Implemented Preparation Example 2 was used instead of the polyolefin-polystyrene-based multi-block copolymer prepared in Implemented Preparation Example 1.

Comparative Example 1—Preparation of Thermoplastic Resin Composition

A thermoplastic resin composition compound was prepared in the same manner as in Example 1 except that the polyolefin-polystyrene-based multi-block copolymer prepared in Comparative Preparation Example 1 was used instead of the polyolefin-polystyrene-based multi-block copolymer prepared in Implemented Preparation Example 1.

Comparative Example 2—Preparation of Thermoplastic Resin Composition

A thermoplastic resin composition compound was prepared in the same manner as in Example 2 except that the polyolefin-polystyrene-based multi-block copolymer prepared in Comparative Preparation Example 1 was used instead of the polyolefin-polystyrene-based multi-block copolymer prepared in Implemented Preparation Example 1.

Comparative Example 3—Preparation of Thermoplastic Resin Composition

A thermoplastic resin composition compound was prepared in the same manner as in Example 1 except that the polyolefin-polystyrene-based multi-block copolymer prepared in Comparative Preparation Example 2 was used instead of the polyolefin-polystyrene-based multi-block copolymer prepared in Implemented Preparation Example 1.

Comparative Example 4—Preparation of Thermoplastic Resin Composition

A thermoplastic resin composition compound was prepared in the same manner as in Example 2 except that the polyolefin-polystyrene-based multi-block copolymer prepared in Comparative Preparation Example 2 was used instead of the polyolefin-polystyrene-based multi-block copolymer prepared in Implemented Preparation Example 1.

Experimental Example 2

1) Tensile Strength, Elongation, and Complex Viscosity

Thermoplastic resin composition compounds of Examples 1 to 4 and Comparative Examples 1 to 4 were each extruded and prepared in a pellet phase, and then the tensile strength at break, elongation at break, and yield strength thereof were measured according to ASTM D638 (50 mm/min).

2) Melt Flow Rate (MFR)

The melt flow rates were measured under the conditions of 230° C. and a 2.16 kg load and 190° C. and a 2.16 kg load, respectively, according to ASTM-D 1238.

TABLE 3

| | Composition of multi-block copolymer | | | Content of multi-block copolymer wt % | Tensile strength MPa | Elongation % | Yield strength MPa | MFR (230° C., 2.16 kg) (g/10 min) | MFR (190° C., 2.16 kg) (g/10 min) |
|---|---|---|---|---|---|---|---|---|---|
| | Ethylene (wt %) | Alpha-olefin (wt %) | Styrene (wt %) | | | | | | |
| Example 1 | 43.6 | 23.7 | 32.6 | 20 | 18.3 | 84 | 18.3 | 122.97 | 47.7 |
| Example 2 | 43.6 | 23.7 | 32.6 | 50 | 27.8 | 1,162 | 11.3 | 10.7 | 2.1 |
| Example 3 | 43.3 | 31.1 | 25.6 | 20 | 15.1 | 63 | 15.1 | — * | 22.3 |
| Example 4 | 43.3 | 31.1 | 25.6 | 50 | 21.9 | 1,228 | 8.7 | 8.4 | 2.0 |
| Comparative Example 1 | 43.4 | 24.8 | 31.8 | 20 | 15.7 | 135 | 15.7 | 91.3 | 39.2 |
| Comparative Example 2 | 43.4 | 24.8 | 31.8 | 50 | 23.9 | 1,586 | 9.2 | 6.3 | 1.5 |
| Comparative Example 3 | 44.3 | 26.2 | 29.5 | 20 | 17.0 | 100 | 17.0 | 104.7 | 42.5 |
| Comparative Example 4 | 44.3 | 26.2 | 29.5 | 50 | 26.1 | 1,230 | 10.2 | 7.1 | 1.8 |

* The MFR (230° C., 2.16 kg) of Example 3 was too high to measure.

As can be seen in Table 3 above, the thermoplastic resin composition including, together with polypropylene, the polyolefin-polystyrene-based multi-block copolymer of Implemented Preparation Example 1 or the polyolefin-polystyrene-based multi-block copolymer of Implemented Preparation Example 2 maintains excellent tensile strength, elongation, and yield strength and exhibits improved fluidity, and thus, is advantageous for injection and double injection and exhibits excellent mechanical physical properties to be suitably used for automotive interior materials and other uses. The thermoplastic resin composition of Example 3 including the polyolefin-polystyrene-based multi-block copolymer of Implemented Preparation Example 2 had a very high MFR value at 230° C. and 2.16 kg, which was not measurable at the time of the experiment, but exhibited an excellent MFR value at 190° C. and 2.16 kg. Accordingly, it has been analyzed that the thermoplastic resin composition of Example 3 may exhibit excellent injection properties by lowering the injection temperature suitably when applied to actual injection.

In addition, when thermoplastic resin compositions were compared with each other, in which the polyolefin-polystyrene-based multi-block copolymer of Implemented Preparation Example 1 and the SEBS of Comparative Preparation Example 1 or the SEBS of Comparative Preparation Example 2 were used in the same content, it was confirmed that the thermoplastic resin composition of Example 1 was significantly superior to the thermoplastic resin compositions of Comparative Examples 1 and 3, and the thermoplastic resin composition of Example 2 was significantly superior to the thermoplastic resin compositions of Comparative Examples 2 and 4 in tensile strength and yield strength as well as melt flow rate.

The invention claimed is:

1. A thermoplastic resin composition comprising:

(1) polypropylene; and (2) a polyolefin-polystyrene-based multi-block copolymer satisfying the following conditions (a) and (b):

(a) Complex viscosity ($\eta^*$) at a temperature of 160° C. and a frequency ($\omega$) of 0.5 rad/s: 40,000 to 350,000 Pa's (b) Complex viscosity at a temperature of 160° C. and a frequency of 125 rad/s: 900 to 3,500 Pa·s.

2. The thermoplastic resin composition of claim 1, wherein the complex viscosity at a temperature of 160° C. and a frequency of 0.5 rad/s is 45,000 to 300,000 Pa's, and the complex viscosity at a temperature of 160° C. and a frequency of 125 rad/s is 1,000 to 3,300 Pa·s.

3. The thermoplastic resin composition of claim 1, wherein a weight average molecular weight of the polyolefin-polystyrene-based multi-block copolymer is 50,000 g/mol to 400,000 g/mol.

4. The thermoplastic resin composition of claim 1, wherein a molecular weight distribution of the polyolefin-polystyrene-based multi-block copolymer is 1.5 to 3.0.

5. The thermoplastic resin composition of claim 1, wherein the polyolefin-polystyrene-based multi-block copolymer is one or more selected from the group consisting of a polystyrene-poly(ethylene-co-propylene)-polystyrene block copolymer, a polystyrene-poly(ethylene-co-1-butene)-polystyrene block copolymer, a polystyrene-poly (ethylene-co-1-pentene)-polystyrene block copolymer, a polystyrene-poly(ethylene-co-1-hexene)-polystyrene block copolymer, a polystyrene-poly(ethylene-co-1-heptene)-polystyrene block copolymer, and a polystyrene-poly(ethylene-co-1-octene)-polystyrene block copolymer.

6. The thermoplastic resin composition of claim 1, wherein the polyolefin-polystyrene-based multi-block copolymer comprises a polystyrene-based block in an amount of 10 wt % to 30 wt %.

7. The thermoplastic resin composition of claim 1, characterized in that the polyolefin-polystyrene-based multi-block copolymer is prepared without a hydrogenation reaction for a double bond in a copolymer main chain.

8. The thermoplastic resin composition of claim 1, wherein the (1) polypropylene and the (2) polyolefin-polystyrene-based multi-block copolymer has a weight ratio of 10:90 to 90:10.

9. The thermoplastic resin composition of claim 1, wherein the thermoplastic resin composition is a thermoplastic resin composition satisfying the physical properties of the following (A) to (E):

(A) Tensile strength of 10 to 35 MPa, (B) Elongation of 20 to 1500%, (C) Yield strength of 5 to 25 MPa, (D) Melt flow rate (MFR, 230° C. and 2.16 kg) of 0.5 to 200 g/10 min, and (E) Melt flow rate (MFR, 190° C. and 2.16 kg) of 2 to 100 g/10 min.

10. The thermoplastic resin composition of claim 1, wherein the polypropylene is a polypropylene homopolymer, or a copolymer of propylene and an alpha-olefin monomer.

11. The thermoplastic resin composition of claim 1, wherein the polypropylene is an impact copolymer having a melt index (MI) of 0.5 g/10 min to 100 g/10 min, specifically 1 g/10 min to 90 g/10 min, measured at 230° C. and a 2.16 kg load.

12. The thermoplastic resin composition of claim 1, wherein the polypropylene is one or more random propylene copolymers having a DSC melting point in the range of 120 to 160° C., and a melt flow rate (MFR) in the range of 5 g/10 min to 120 g/10 min measured under the condition of 230° C. and a 2.16 kg load according to ASTM-D 1238.

13. The thermoplastic resin composition of claim 1, wherein the polyolefin-polystyrene-based multi-block copolymer comprises a triblock copolymer including a polyolefin block including one or more kinds of repeating units represented by Formula a below, a first polystyrene block including a repeating unit represented by Formula c below, and a second polystyrene block including a repeating unit represented by Formula f below,

[Formula a]

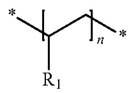

[Formula c]

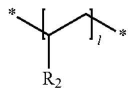

[Formula f]

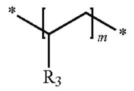

in the above formulas, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, $R_2$ and $R_3$ are each independently aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, n is an integer of 10 to 10,000, and l and m are each independently an integer of 10 to 1,000.

14. A method for preparing a polyolefin-polystyrene-based multi-block copolymer, the method comprising:

(S1) forming a polyolefin block by polymerizing an olefin-based monomer using an organozinc compound as a chain transfer agent in the presence of a catalyst composition including a transition metal compound represented by Formula 1 below:

[Formula 1]

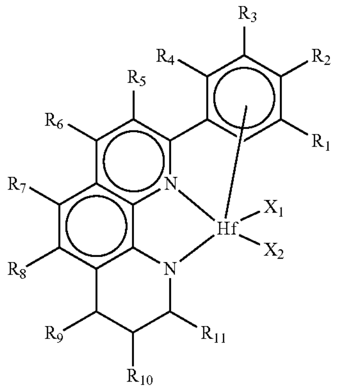

in Formula 1 above, $R_1$ to $R_{11}$ are each independently hydrogen, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkoxy group having 7 to 20 carbon atoms, an alkoxy group having 1 to 20 carbon atoms, an alkylaryl group having 7 to 20 carbon atoms, an alkylsilyl group having 1 to 20 carbon atoms, or an arylalkyl group having 7 to 20 carbon atoms, two or more of $R_1$ to $R_{11}$ adjacent to each other are optionally connected to each other to form an aliphatic ring having 3 to 20 carbon atoms or an aromatic ring having 6 to 20 carbon atoms, and $X_1$ and $X_2$ are each independently hydrogen, halogen, a hydroxyl group, an amino group, a thio group, a silyl group, a cyano group, a nitro group, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms, a heteroaryl group having 5 to 20 carbon atoms, an alkoxy group having 1 to 20 carbon atoms, an aryloxy group having 6 to 20 carbon atoms, an alkylamino group having 1 to 20 carbon atoms, an arylamino group having 6 to 20 carbon atoms, an alkylthio group having 1 to 20 carbon atoms, an arylthio group having 6 to 20 carbon atoms, an alkylsilyl group having 1 to 20 carbon atoms, or an arylsilyl group having 6 to 20 carbon atoms, and (S2) forming a polystyrene block by anionic polymerization of the polyolefin block and a styrene-based monomer in the presence of an alkyl lithium compound including silicon atom and a triamine compound.

15. The method of claim 14, wherein the polyolefin-polystyrene-based multi-block copolymer satisfies the following conditions (a) and (b):

(a) Complex viscosity ($\eta^*$) at a temperature of 160° C. and a frequency ($\omega$) of 0.5 rad/s: 40,000 to 350,000 Pa·s (b) Complex viscosity at a temperature of 160° C. and a frequency of 125 rad/s: 900 to 3,500 Pa·s.

16. The method of claim 14, wherein $R_1$, $R_2$, and $R_5$ to $R_{10}$ are hydrogen, and $R_3$, $R_4$, and $R_{11}$ are each independently hydrogen, or an alkyl group having 1 to 20 carbon atoms, wherein $R_3$ and $R_4$ are optionally connected to each other to form an aromatic ring having 5 to 20 carbon atoms.

17. The method of claim 14, wherein the transition metal compound represented by Formula 1 is represented by any one among Formula 1-1 to Formula 1-5:

[Formula 1-1]

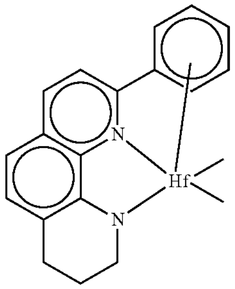

[Formula 1-2]

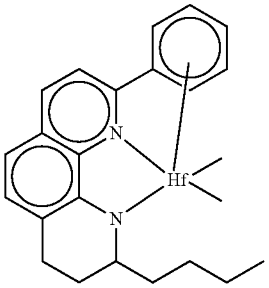

[Formula 1-3]

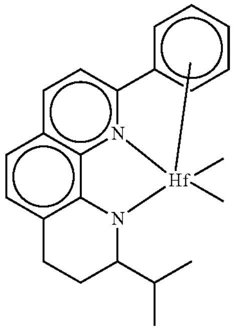

[Formula 1-4]

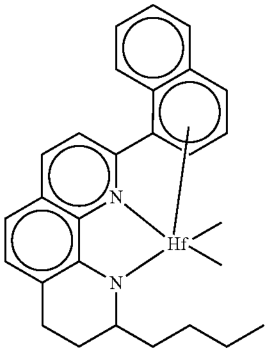

-continued
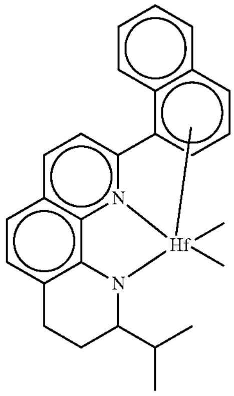
* * * * *
[Formula 1-5]